US012581100B1

(12) United States Patent
Lapicque et al.

(10) Patent No.: US 12,581,100 B1
(45) Date of Patent: Mar. 17, 2026

(54) VIDEO ENCODING USING RECONSTRUCTION OF SPATIALLY DECIMATED FRAMES

(71) Applicant: Nvidia Corporation, Santa Clara, CA (US)

(72) Inventors: Olivier Lapicque, Deerfield Beach, FL (US); David Stanislaw Pajak, San Carlos, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 18/933,965

(22) Filed: Oct. 31, 2024

(51) Int. Cl.
| | |
|---|---|
| *H04N 19/33* | (2014.01) |
| *H04N 19/117* | (2014.01) |
| *H04N 19/136* | (2014.01) |
| *H04N 19/182* | (2014.01) |

(52) U.S. Cl.
CPC ........... *H04N 19/33* (2014.11); *H04N 19/117* (2014.11); *H04N 19/136* (2014.11); *H04N 19/182* (2014.11)

(58) Field of Classification Search
CPC .... H04N 19/33; H04N 19/117; H04N 19/136; H04N 19/182
See application file for complete search history.

(56) References Cited

U.S. PATENT DOCUMENTS

| | | | | |
|---|---|---|---|---|
| 5,592,226 A | * | 1/1997 | Lee ........................ | H04N 19/63 375/E7.22 |
| 7,813,430 B2 | * | 10/2010 | Kobayashi ........... | H04N 19/182 375/240.21 |
| 8,213,497 B2 | * | 7/2012 | Kobayashi ........... | H04N 19/587 375/240 |
| 8,774,517 B1 | * | 7/2014 | Khosla ................... | G06V 20/52 348/231.3 |

(Continued)

OTHER PUBLICATIONS

Chia-Huang Lin and Kuei-Ann Wen, "Spatial/temporal decimation on 3DPAC for very low bit rate video transmission," 2000 IEEE International Symposium on Circuits and Systems (ISCAS), Geneva, Switzerland, 2000, pp. 725-728 vol. 4, doi: 10.1109/ISCAS.2000. 858854. (Year: 2000).*

(Continued)

*Primary Examiner* — Justin W Rider
(74) *Attorney, Agent, or Firm* — Hogan Lovells US LLP

(57) ABSTRACT

Approaches presented herein provide for the high quality, high resolution reconstruction of a sequence of decimated images, such as may be useful for remote desktop applications. The video frames can be sub-sampled or decimated such that each encoded frame only includes a fraction (e.g., ¼) of the total pixel values for the full resolution frame. A server can analyze the current and previous video frames at full resolution to determine motion or actionable changes, and can apply a lowpass filter to those values based on the type of interpolation to be performed on the client. Static values can remain where no motion is detected. When (Continued)

a client receives the decimated and encoded video frames, the client can determine areas of motion and can perform bilinear interpolation for only those portions of the image where motion is detected, and can otherwise perform weaving of the static pixel values received over a limited sequence of decimated video frames.

20 Claims, 21 Drawing Sheets

(56)                References Cited

U.S. PATENT DOCUMENTS

2005/0259740 A1\*  11/2005  Kobayashi ........... H04N 19/182
                                                                375/E7.181
2006/0023089 A1\*  2/2006  Kobayashi ............. H04N 5/772
                                                                375/E7.184
2008/0008241 A1\*  1/2008  Park ..................... H04N 19/615
                                                                375/240.16
2008/0122860 A1\*  5/2008  Amann .................... H04N 9/64
                                                                348/E7.012
2009/0116688 A1\*  5/2009  Monacos ............... G06V 10/25
                                                                382/103
2013/0156113 A1\*  6/2013  Ismael-Mia ........... H04N 19/59
                                                                375/240.26
2020/0324409 A1\*  10/2020  Gonzalez Aguirre ......................
                                                                B25J 9/1661
2023/0368337 A1\*  11/2023  Karras ...................... G06T 5/70
2024/0161250 A1\*  5/2024  Balaji ....................... G06T 5/70

OTHER PUBLICATIONS

M.-q. Li and Z.-q. Xu, "An Error Resilient Coding Scheme for Video Transmission Based on Pixel Line Decimation," 2008 Second International Symposium on Intelligent Information Technology Application, Shanghai, China, 2008, pp. 315-320, doi: 10.1109/ IITA.2008.513. (Year: 2008).\*

\* cited by examiner

100

Word Processor

Dear Sally:

Thank you for _

104

Client Device

102

• • •

Presentation

Fiscal Year

108

Client Device

106

Network
110

Interface

114

Resource
Manager

112

User

116

Resource

118

Server

CPU

GPU

Memory

120

122

124

126

Cloud Resource
Environment

128

Image before change 310

Image after change 312

First video frame 320

Second video frame 322

Third video frame 324

Fourth video frame 326

350

Portion of first frame 352

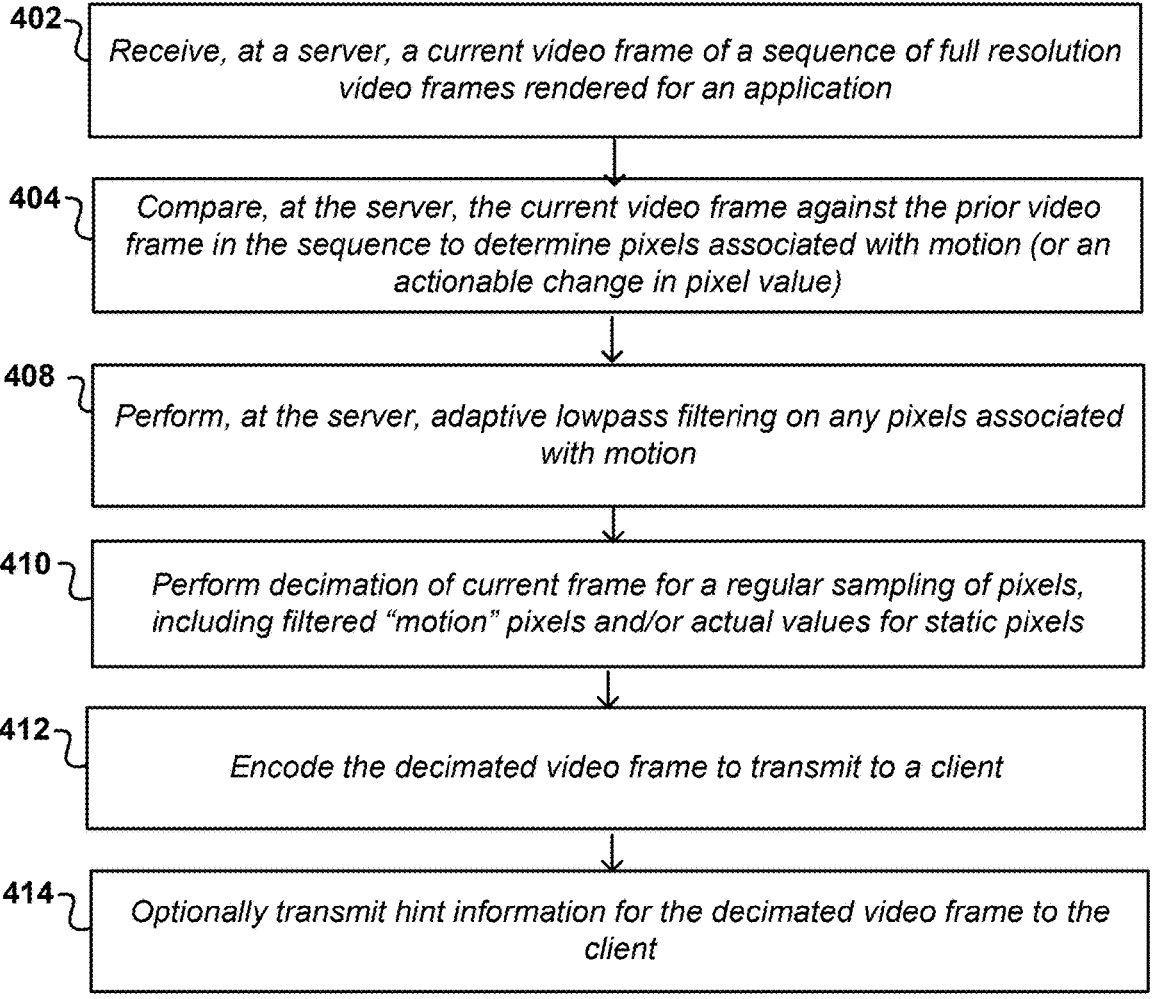

402 — Receive, at a server, a current video frame of a sequence of full resolution video frames rendered for an application 404 — Compare, at the server, the current video frame against the prior video frame in the sequence to determine pixels associated with motion (or an actionable change in pixel value)

408 — Perform, at the server, adaptive lowpass filtering on any pixels associated with motion 410 — Perform decimation of current frame for a regular sampling of pixels, including filtered "motion" pixels and/or actual values for static pixels 412 — Encode the decimated video frame to transmit to a client 414 — Optionally transmit hint information for the decimated video frame to the client

FIG. 4A

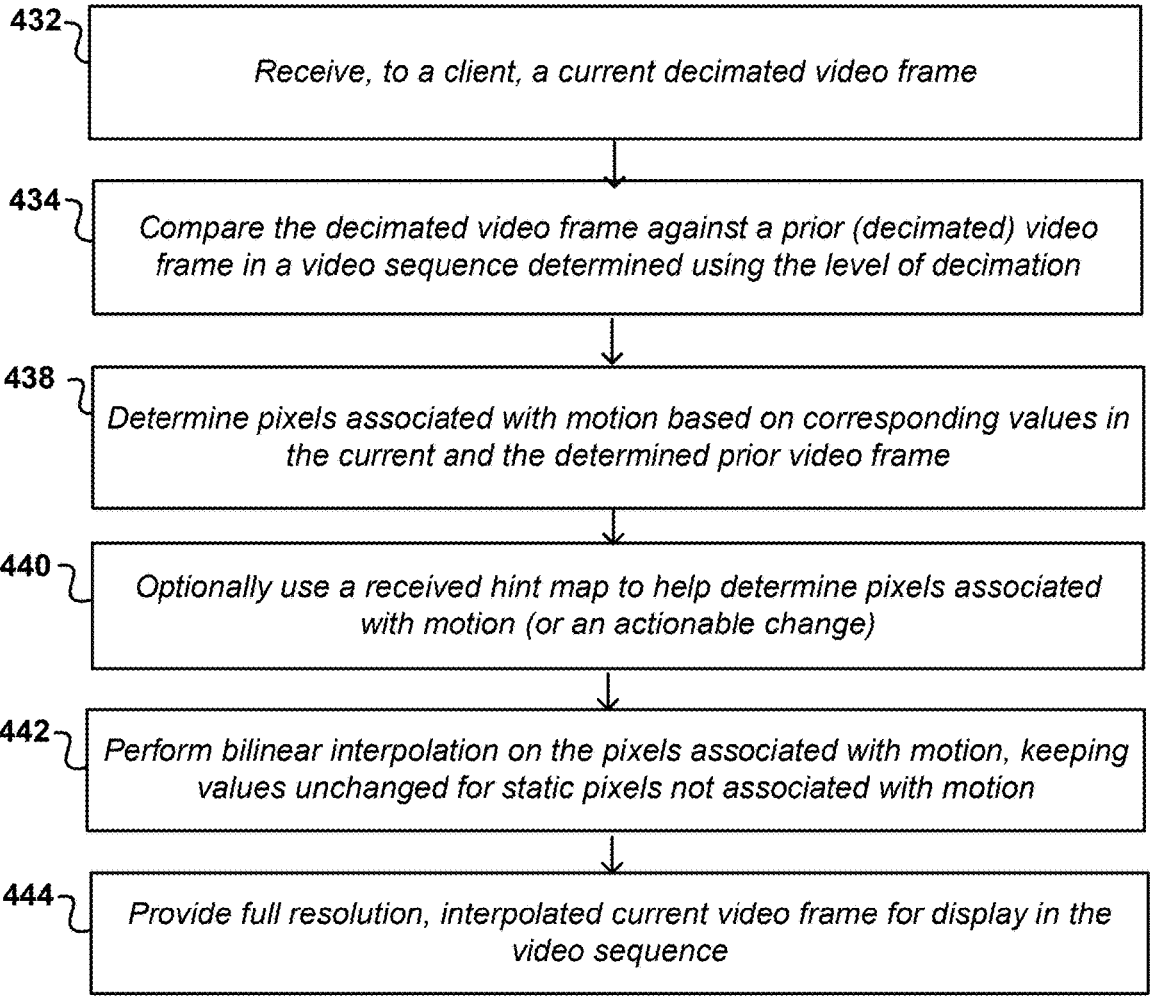

430

432 — Receive, to a client, a current decimated video frame

434 — Compare the decimated video frame against a prior (decimated) video frame in a video sequence determined using the level of decimation 438 — Determine pixels associated with motion based on corresponding values in the current and the determined prior video frame 440 — Optionally use a received hint map to help determine pixels associated with motion (or an actionable change)

442 — Perform bilinear interpolation on the pixels associated with motion, keeping values unchanged for static pixels not associated with motion 444 — Provide full resolution, interpolated current video frame for display in the video sequence

FIG. 4B

460

462 — Generate, from a full resolution image, a decimated image including pixel values for a selected subset of pixels, the pixel values including filtered values where an actionable change is detected and actual values where no actionable change is detected 464 — Encode the decimated image to be transmitted to a client device, wherein the client device is allowed to reconstruct the full resolution image over a sequence of video frames using interpolation on the included pixel values where an actionable change is detected

FIG. 4C

DATA CENTER
800
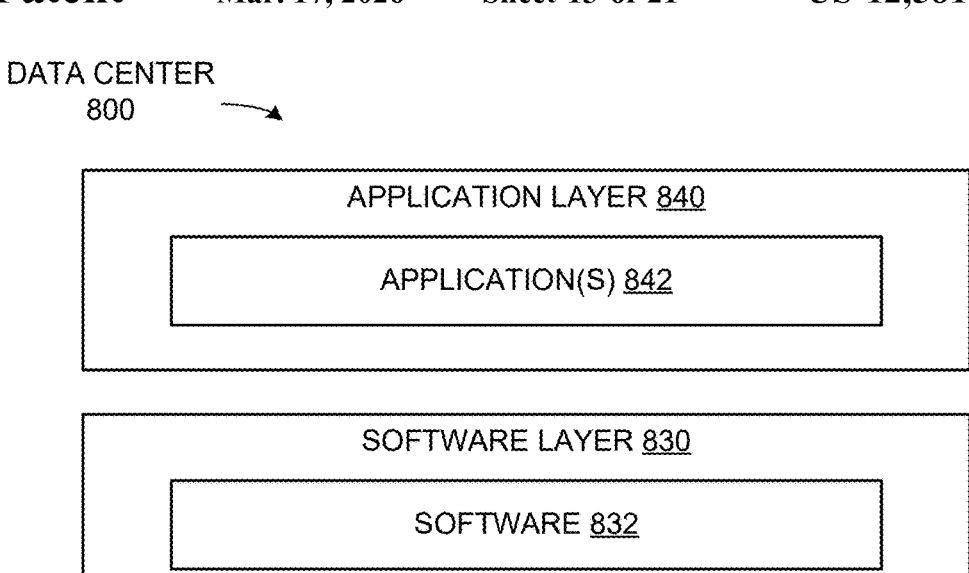
APPLICATION LAYER 840
APPLICATION(S) 842
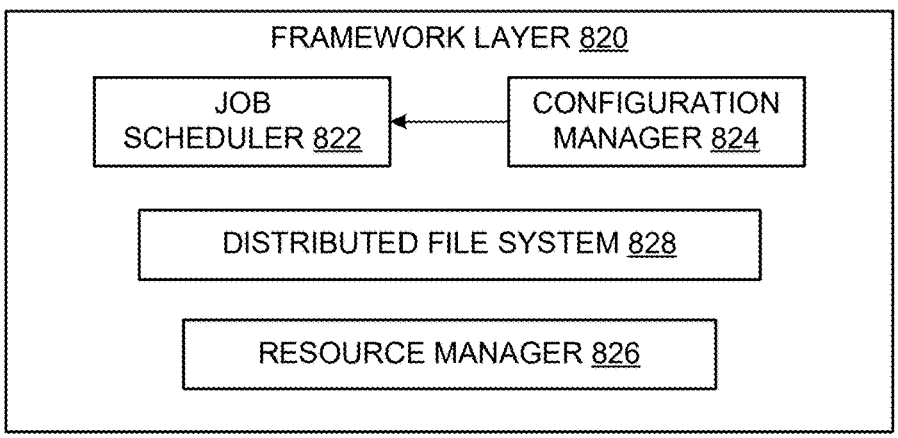
SOFTWARE LAYER 830
SOFTWARE 832
FRAMEWORK LAYER 820
JOB SCHEDULER 822
CONFIGURATION MANAGER 824
DISTRIBUTED FILE SYSTEM 828
RESOURCE MANAGER 826
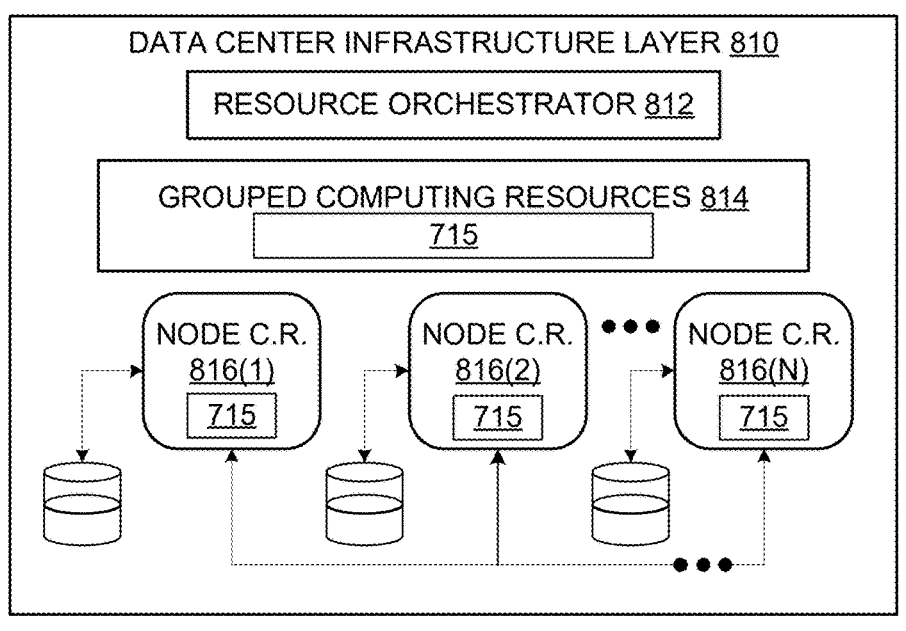
DATA CENTER INFRASTRUCTURE LAYER 810
RESOURCE ORCHESTRATOR 812
GROUPED COMPUTING RESOURCES 814
715
NODE C.R. 816(1)
715
NODE C.R. 816(2)
715
• • •
NODE C.R. 816(N)
715
FIG. 8

FIG. 14

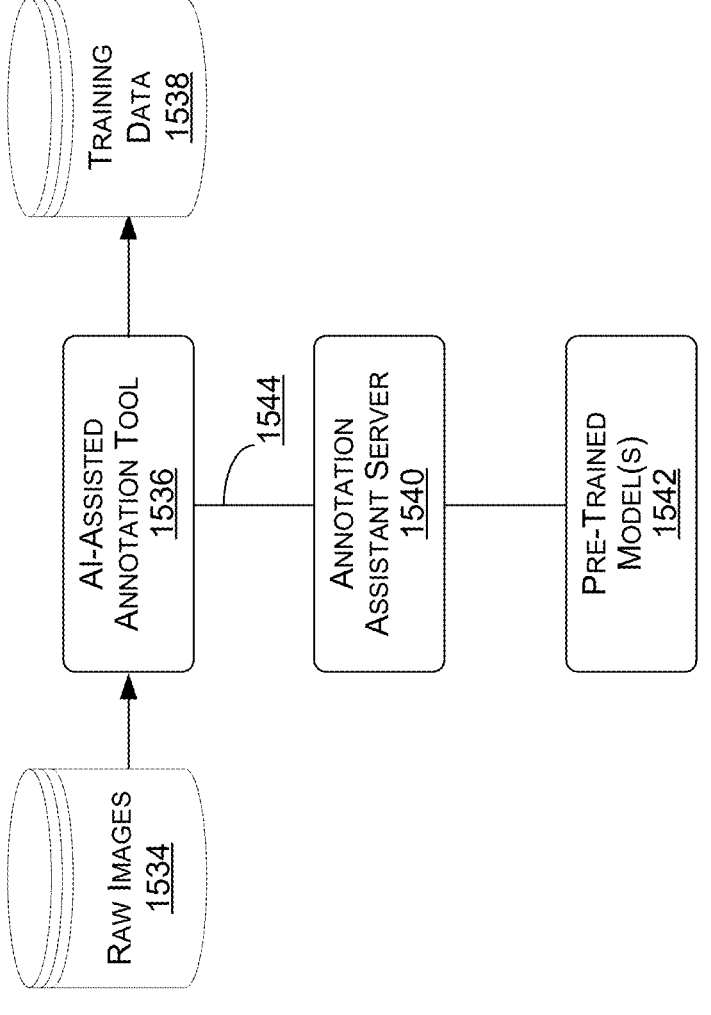
FIG. 15B

VIDEO ENCODING USING RECONSTRUCTION OF SPATIALLY DECIMATED FRAMES

BACKGROUND

There is an increasing use of shared resources—often referred to as cloud resources—to allow a group of (potentially unrelated) users to use portions of this shared resource capacity to perform various tasks. In many instances, a user can use these cloud resources to operate a virtual computer to perform various tasks, where the majority of the functionality will execute in the cloud. In order to provide an interface for such applications, the cloud resources may provide a streaming display of video data that presents the current state of a virtual desktop or application, including any changes as they occur. Such an approach can provide a significant workload for processor-heavy applications and/or large numbers of users allocated to specific resources, and there can be bottlenecks due to factors such as limited video encoder throughput. In many instances, however, the number or extent of changes between any two frames may be limited, resulting in a high load on a video encoder with little use of graphics hardware resources, which can unnecessarily limit the number of concurrent users allocated to a given resource, which increases cost and decreases utilization of these resources.

BRIEF DESCRIPTION OF THE DRAWINGS

Various embodiments in accordance with the present disclosure will be described with reference to the drawings, in which:

FIGS. 4A, 4B, and 4C illustrate example processes that can be performed to pre-process, decimate, and reconstruct video data, according to at least one embodiment;

FIG. 8 illustrates an example data center system, according to at least one embodiment;

FIG. 14 is a system diagram for an example system for training, adapting, instantiating and deploying machine learning models in an advanced computing pipeline, in accordance with at least one embodiment; and FIGS. 15A and 15B illustrate a data flow diagram for a process to train a machine learning model, as well as client-server architecture to enhance annotation tools with pre-trained annotation models, in accordance with at least one embodiment.

DETAILED DESCRIPTION

Figure 1:
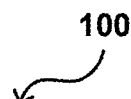
FIG. 1 illustrates a system for decimating and reconstructing video frames, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles or machines, semi-autonomous or autonomous vehicles or machines (e.g., in one or more advanced driver assistance systems (ADAS), one or more in-vehicle infotainment systems, one or more emergency vehicle detection systems), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, generative AI, model training or updating, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, generative AI, cloud computing, and/or any other suitable applications.

Disclosed embodiments may be comprised in a variety of different systems such as automotive systems (e.g., an in-vehicle infotainment system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as large language models (LLMs), vision language models (VLMs), or multi-modal language models, etc., systems for performing generative AI operations (e.g., using one or more language models, transformer models, etc.), systems for performing light transport simulation, systems for performing collaborative content creation for 3D assets, systems implemented at least partially using cloud computing resources, and/or other types of systems.

Approaches in accordance with various illustrative embodiments allow for high quality, high resolution reconstruction of a sequence of decimated images, such as may be useful for remote desktop and other such applications. One approach to reducing an amount of data to be encoded and transmitted for each frame is to divide (decimate) the image up into an array of four pixel cells, and only send data for one field (corresponding to one of the four pixels) of each cell in a given frame. In a sequence of static images where there is no motion between frames, this means that after a sequence of four frames, high resolution data will have been transmitted for all pixel locations so that the reconstructed image on the client side will be the same as the high resolution image on the server side. In operation, however, there will frequently be at least some changes in pixel values due to motion (or other actionable changes) between sequential frames, as may be due to movement of a cursor or a typing of text, etc. Reconstructing individual frames using only the decimated data for those frames can result in blurriness, or other artifacts, which may be unacceptable for fine details such as may be found in text entered into an interface. Various embodiments can detect changes for specific pixel regions on the server side, which has access to the full, high resolution frames, and can encode values in those pixel locations that will result in a higher quality reconstructed image on the client side. As an example, a 3×3 grid of pixels can be evaluated around a given pixel location, and if the maximum difference between the current and prior value for one of those pixels exceeds a difference threshold, then it can be determined that motion (or another such actionable change) occurred within that region. Instead of then transmitting the current value for the pixel from the current high resolution frame, an adaptive lowpass filter (e.g., a 5×5 pixel lowpass filter designed to minimize reconstruction error at the client) can be applied to generate a value for that pixel that takes into account pixel values of neighboring pixels. When reconstruction is then performed on the client side based on that pixel, as one of the four values in a cell transmitted for a given frame, the reconstruction will be based in part upon values of the surrounding pixels, which can result in a more accurate upscaled image frame. Since the client will not have access to the full resolution image frames, the client can look back four frames (for 4:1 decimation) to see if there was a change in that specific pixel value (or a neighboring pixel). If not, then the current pixel value can be used. If there was a difference, then motion or an actionable change can be determined to have occurred for that pixel (or pixel region), and upsampling can be performed rather than weaving together the current (or most recent) values for each pixel in the four pixel cell. In some embodiments, since large instantaneous changes can lead to a short sequence of low quality frames due to the client detecting a change over the sequence of four decimated frames but the server determining there was no change over the last two high resolution frames, a hint map can be used that indicates where motion was detected by the server, so the client can determine whether to perform weaving or upsampling for various cells of pixels in the reconstructed image. In some embodiments, machine learning can be trained to generate a decimated (or lower resolution) image that can generate a high quality reconstructed image on the client based on an end-to-end training process that takes into account the reconstruction process to be performed on the client.

Variations of this and other such functionality can be used as well within the scope of the various embodiments as would be apparent to one of ordinary skill in the art in light of the teachings and suggestions contained herein.

FIG. 1 illustrates an example cloud architecture 100 that can be used according to at least one embodiment. Such cloud architecture 100 can be used to allow multiple client devices 102, 106 to access shared resources of a cloud resource environment 128 (or other shared network environment). A given client device 102 can transmit requests across at least one network 110, such as the Internet or a cellular network, that can be received to an interface of an interface layer 114 of the cloud resource environment 128. The interface layer 114 can include networking component such as routers, load balancers, and network switches in addition to ports, addresses, and application programming interfaces (APIs), and can direct the requests to the appropriate resource(s) in the cloud resource environment. In this example, there are multiple client devices 102, 106 each interacting with a respective cloud application. When submitting a request to launch an application, the request from these clients devices 102, 106 may be directed to a resource manager 112, which can authenticate the request using data in a user or account database 116, for example, and can then check the resources 118 available in a pool of resource capacity to allocate a portion of the capacity of one or more of the resources 118 to host the application, such as a virtual desktop application. In this example, the resource manager 112 has allocated a shared server 120 to host the virtual desktop applications for the client devices. The server 120 will use the same internal resources or components, such as the same central processing unit (CPU) 122, graphics processing unit (GPU) 124, and memory 126 to execute the virtual desktop applications. In this example, each client device 102, 106 can receive a continuous video stream including a representation of the respective virtual desktop updated in real time, which can be displayed on a respective display 104, 108 of, or associated with, those devices. Although only two client devices are illustrated that share a single server, it should be understood that there may be a very large number of client devices (or other devices or entities) that may use these and other resources, of the same or different types, in such a cloud resource environment 128.

As mentioned, the concept of virtualized personal computers has emerged as a significant component to cloud computing offerings. This virtualized approach centers around offering users a cutting-edge virtual desktop infrastructure (VDI) environment. VDI technology allows for server-side, state-of-the-art graphics processing, empowering remote thin clients to access high-end graphical capabilities as well as regular desktop and/or office types of applications. Such technology also addresses a growing demand for advanced graphics in various industries, while also catering to the need for remote accessibility and flexible computing solutions. One example of such technology is Microsoft's Azure Virtual Desktop providing virtualized desktops running on NVIDIA GPUs in the cloud.

Existing hardware and/or software architectures may be optimized for remote streaming of processor (e.g., graphics processing unit (GPU))-heavy applications that can produce highly dynamic video sequences at low-latency, such as may be used in providing gaming content. There are certain use cases, however, where such an architecture may end up being bottlenecked by factors such as video encoder throughput. Such use cases can include simple remote desktop streaming, where knowledge workers stream video at high-resolutions and framerates (e.g., 4K video at 60 hz)

but use applications (e.g., Microsoft Office, web browsers, or CAD/CAM applications) that yield little motion and pixel changes frame-to-frame. Video encoding is traditionally quite slow on a CPU, where a dedicated engine performs the encoding. It will often be necessary to render frames at a reasonable refresh rate, such as at a rate faster than the frames need to be rendered. Specifics of such workloads, such as presenting a high load on a video encoder with little-to-no use of GPU compute resources, can limit the number of client sessions that cloud users can fit per physical GPU in a datacenter, which increases cost and reduces the appeal of these offerings.

In an example where a user is working on a document in a word processing application, there is very little actually changing on the screen at any given time. The GPU is mostly idle and the server is primarily encoding the video data. In such scenarios, encoding is the bottleneck as there is not much else going on in the system. The number of sessions that can concurrently encode is what limits the number of users that can be allocated per GPU in such instances. It would be desirable to have more sessions and/or users allocated per GPU, which helps to save cost and improve resource utilization. CPU encoders generally are a little more flexible—they can detect aspects such as such as only certain portions of the screen changing between frames. That can be challenging for video codecs. Further, GPU encoders tend to have a fixed performance set to handle the worst case, so there may be limited flexibility to make improvements. One approach would be to use a lower resolution frame to encode, but such an approach can cause text to become blurry. Slight blurring may be acceptable for operations relating to gaming or movies, but not for text editing or other fine detail operations.

Approaches in accordance with at least one embodiment can overcome at least some of these and other such deficiencies in prior solutions using one or more schemes that can be used to support various types of applications, such as remote desktop and knowledge worker types of applications. Such approaches can improve server-side scalability while reducing the load on a video encoder by, for example, streaming reduced and/or decimated resolution images or video frames, which can be used for full-resolution frame buffer reconstruction on a thin client or other such device.

In at least one embodiment, given a sequence of images that is spatially decimated, a reconstruction of full spatial resolution can be performed in areas where there is no motion, while also minimizing image quality loss in areas with motion (or other actionable changes). Such reconstruction can be performed in two dimensions, where a frame is decimated both horizontally and vertically, and reconstruction can be helped by pre-processing prior to decimation. Reconstruction can be performed without introducing additional transmission delay, such as by not using future frames for the reconstruction, and can be lightweight in terms of compute on both the server and the client. Such approaches can also be free of any assumption on the underlying OS or software stack.

Figure 2A:
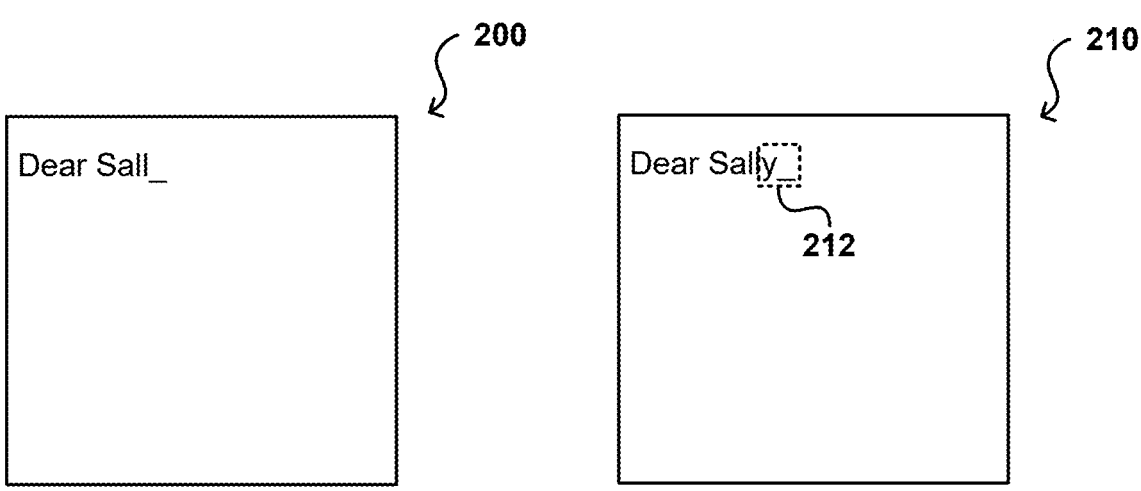
FIGS. 2A and 2B illustrate views of actionable changes between successive video frames, according to at least one embodiment.

FIG. 2A illustrates an example pair of video frames 200, 210 in a sequence that can be streamed for a VDI application in accordance with various embodiments. As illustrated, these video frames 200, 210 correspond to states of a word processing application executing on a virtual desktop. As the user types, there will be additional letters or characters represented on the screen, such as the addition of the letter "y" in the second frame 210 with respect to the first frame. The addition of this letter can also move the placement of a cursor or text input in the display. As illustrated, the changes between these video frames 200, 210 frames are limited to a small area 212 or portion of the video frame 210. Approaches in accordance with various embodiments can take advantage of the fact that a significant portion of the pixels remain unchanged between successive video frames to reduce the amount of data and processing that needs to be performed for any given video frame.

Figure 2B:
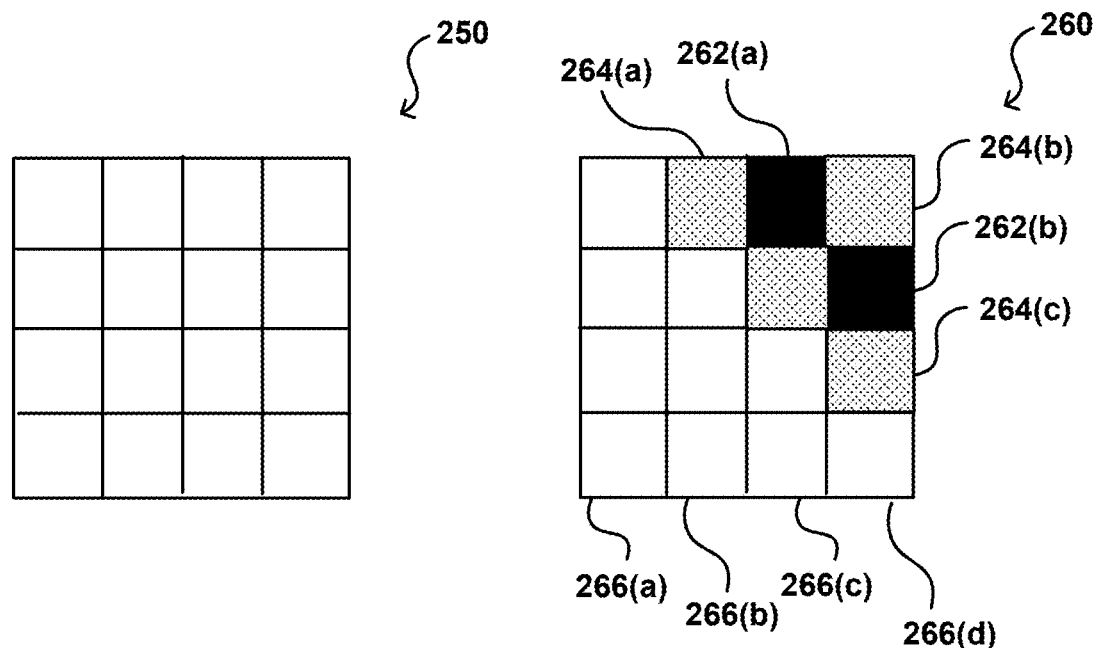

FIG. 2B illustrates zoomed views 250, 260 of a portion of the video frames corresponding to the region of the "y" added in FIG. 2A. In the zoomed view 250 of the first image, there is no character present so all pixels have the color of the background, in this case having white color values. In the zoomed view 260 of FIG. 2B, there are two pixels 262(a), 262(b) that now have black color values, associated with a portion of the letter "y" that is now represented. Due to a process such as filtering or anti-aliasing, which can help to smooth the appearance of the letter, there are also adjacent pixels 264(a), 264(b), 264(c) that have a gray color value (may be different values for each pixel). In this disclosure, the change of pixel color value for a given pixel between any two frames will be referred to as "motion" or value change. As illustrated, there are also a number of pixels 266(a)-266 (d) in the zoomed view 260 that are still white, and remain (primarily) unchanged with respect to the prior frame. These pixels can be referred to as having no motion, or being static. In some instances, there may be slight variations in precise color value for a given pixel location between frame, but small variations such as those having less than a threshold difference in color value, may be considered to be static or otherwise not correspond to an "actionable" change in value that would be considered motion. For example, on a 0-255 color scale, any change in value of 3 or less (or 5 or less, etc.) may be considered to not correspond to an actionable change.

Approaches in accordance with various embodiments can take advantage of the fact that many of the pixel values for a given application will remain unchanged between frames (at least within an acceptable range of noise or encoder variation). In at least one embodiment, this can include decimating the video stream so that only a subset of pixel values are transmitted for any given video frame. For 2:1 decimation, this would include transmitting data for half of the pixel locations in a given frame. For 4:1 decimation, this can include transmitting data for a quarter of the pixel locations in a given frame. Such an approach can significantly reduce the amount of data to be transmitted for individual frames, which can significantly lighting the load on a video encoder or other such resource. Each pixel location will also have its value correctly updated every fourth frame at most, and for static pixels the values can remain correct between frames.

Figure 3A:
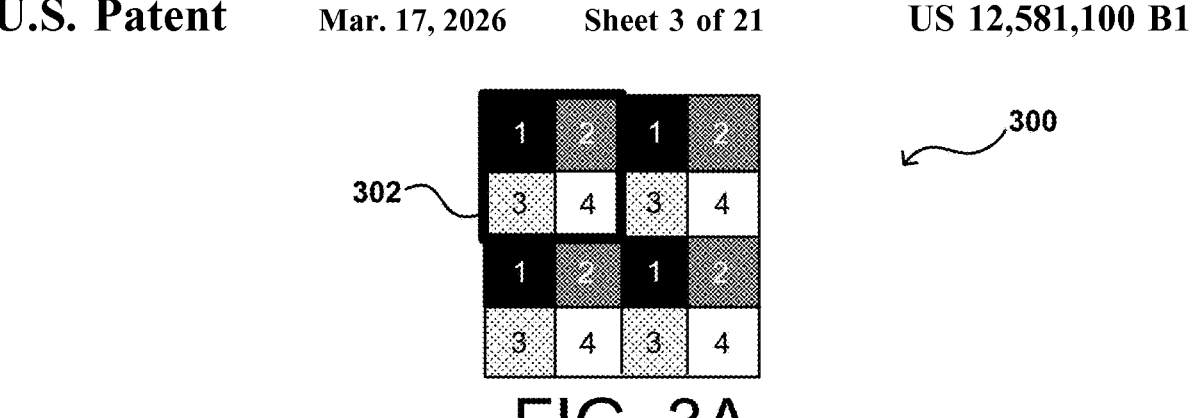
FIGS. 3A, 3B, 3C, and 3D illustrate example representations of changes in video data between frames, according to at least one embodiment.

FIG. 3A illustrates an array of pixels 300 in accordance with at least one embodiment. As illustrated, the array can be segmented into 2×2 sub-arrays 302 of four pixels each, corresponding to 4:1 decimation. Each sub-array will have pixels labeled 1, 2, 3, and 4 in this example. When transmitting decimated video, each frame will include only those pixels for a single label. As an example, a first frame can include the pixel values for only those pixels labeled "1," a second frame can include the pixel values for only those pixels labeled "2," a third frame can include the pixel values for only those pixels labeled "3," and a fourth frame can include the pixel values for only those pixels labeled "4." In such an approach, all pixels will have their pixel values transmitted (and updated if appropriate) every fourth frame.

Figure 3B:
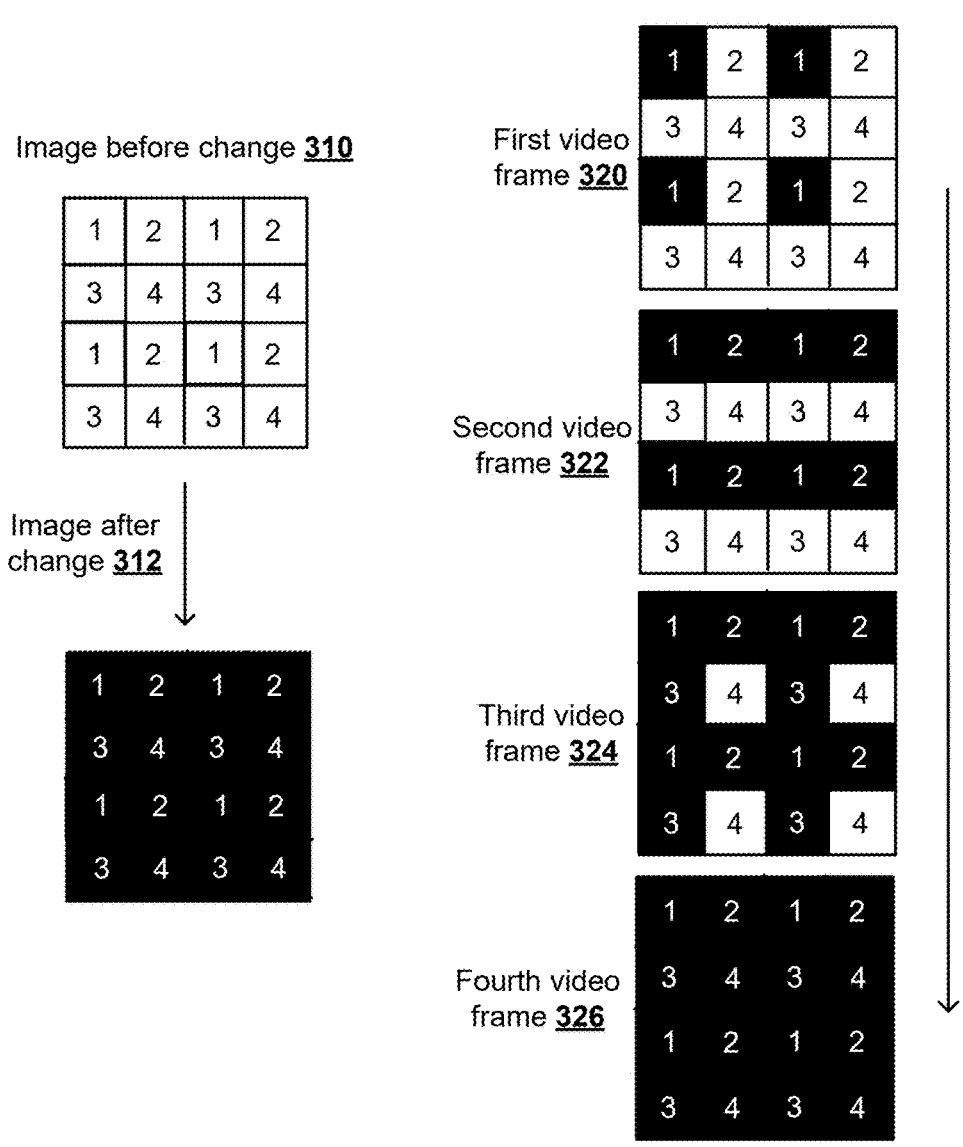

As an example, consider an image 310 before a given change as illustrated in FIG. 3B. As long as these pixels remain static, the transmitted image for these pixels will remain correct even though each pixel value is only transmitted every fourth video frame. This example illustrates the pixels after a change occurs to those pixels in the image 312. Ignoring filtering, anti-aliasing, or other processing discussed herein, the sequence of four video frames 320, 322, 324, 326 on the right illustrates how the pixel values would be updated over the next four video frames. After the fourth video frame 326, the pixels would have their correct color value (assuming no further changes in color value during that time). While such an approach might appear to be less than optimal from an appearance quality standpoint, in many situations there will not be large updates for significant region of a display between frames, and for displays that refresh at 30 Hz-60 Hz or more, a sequence of four frames can take on the order of about a tenth of a second or less, and may not be noticeable to the average user, particularly once filtering, anti-aliasing, or other such processing is performed on the client device.

Approaches in accordance with various embodiments can also take advantage of the fact that the server rendering the video frames will have access to the full image data for each video frame, and can also be aware of the type of filtering that the client device will perform upon receiving a video frame to be presented. For example, a rendering application executing on the server may have access to information that the client device will perform a certain type of filtering, such as 3×3 adaptive filtering, on an image to be displayed. The server can then perform a type of pre-processing of a video frame, using the same type of filtering that would be used on the client device, to generate a server-local copy of what the video frame would look like after filtering on the client if the full image were transmitted to the client for each video frame. Such an approach then allows the server to transmit values for the pixels included in the decimated video frames that, when the filter is applied by the client device, will result in an image that is closer to the target image than if no such pre-processing were performed.

Figure 3C:
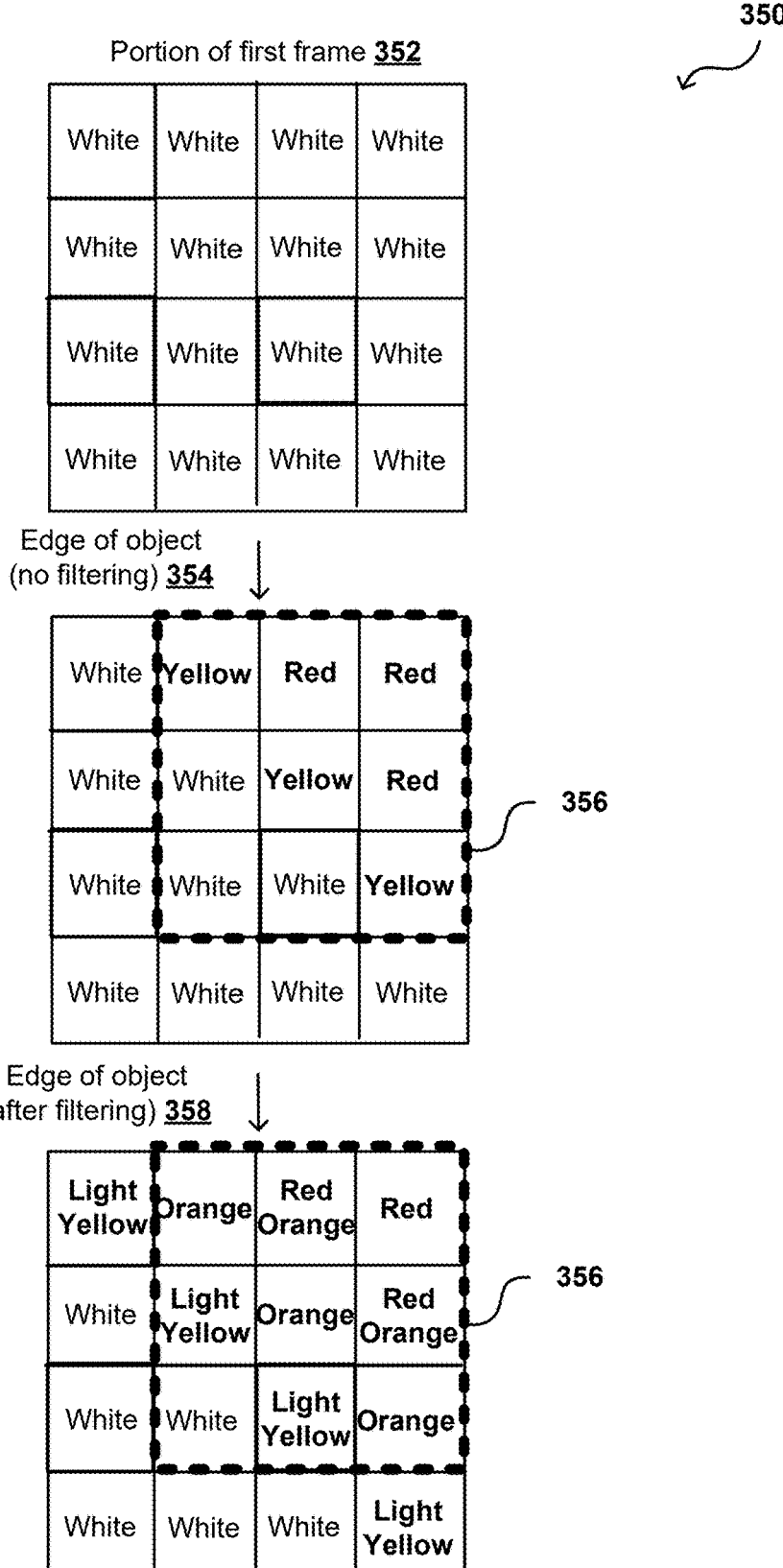

FIG. 3C illustrates example changes in pixel values 350 according to at least one embodiment. A zoomed view 352 of a first frame is illustrated, where all pixel values are white. An edge of an object might come into view in a second frame, resulting in actionable changes or motion for some of the pixels in the zoomed view of a second frame 354. As illustrated, this may correspond to a red object with a yellow border that is less than one pixel in width. A client device receiving this set of pixels can apply a 3×3 adaptive lowpass filter on groups 356 of nine neighboring pixels, which as illustrated in the zoomed and filtered image 358 causes changes to the color values for at least some of the pixels in that group 256 of nine pixels. While the bulk of the object can still appear red, pixels along the border can have orange or light yellow color values, in addition to yellow in some examples, which can help the edge of the object to appear smoother and less jagged as known for anti-aliasing and other such filtering. If a cloud server (or other such resource) can perform such filtering on the full image before determining color values to send in the decimated video frames, the server can send values that will result in an image that is closer to the target filtered image 358 than if the server just sent the new color values for pixels of that image that do not take this filtering into consideration. Taking the filtering into consideration can also help the values of those pixels that are not included in a given video frame to be updated to a value that is closer to the actual current value from the full image, which can help to further improve image quality.

Figure 3D:
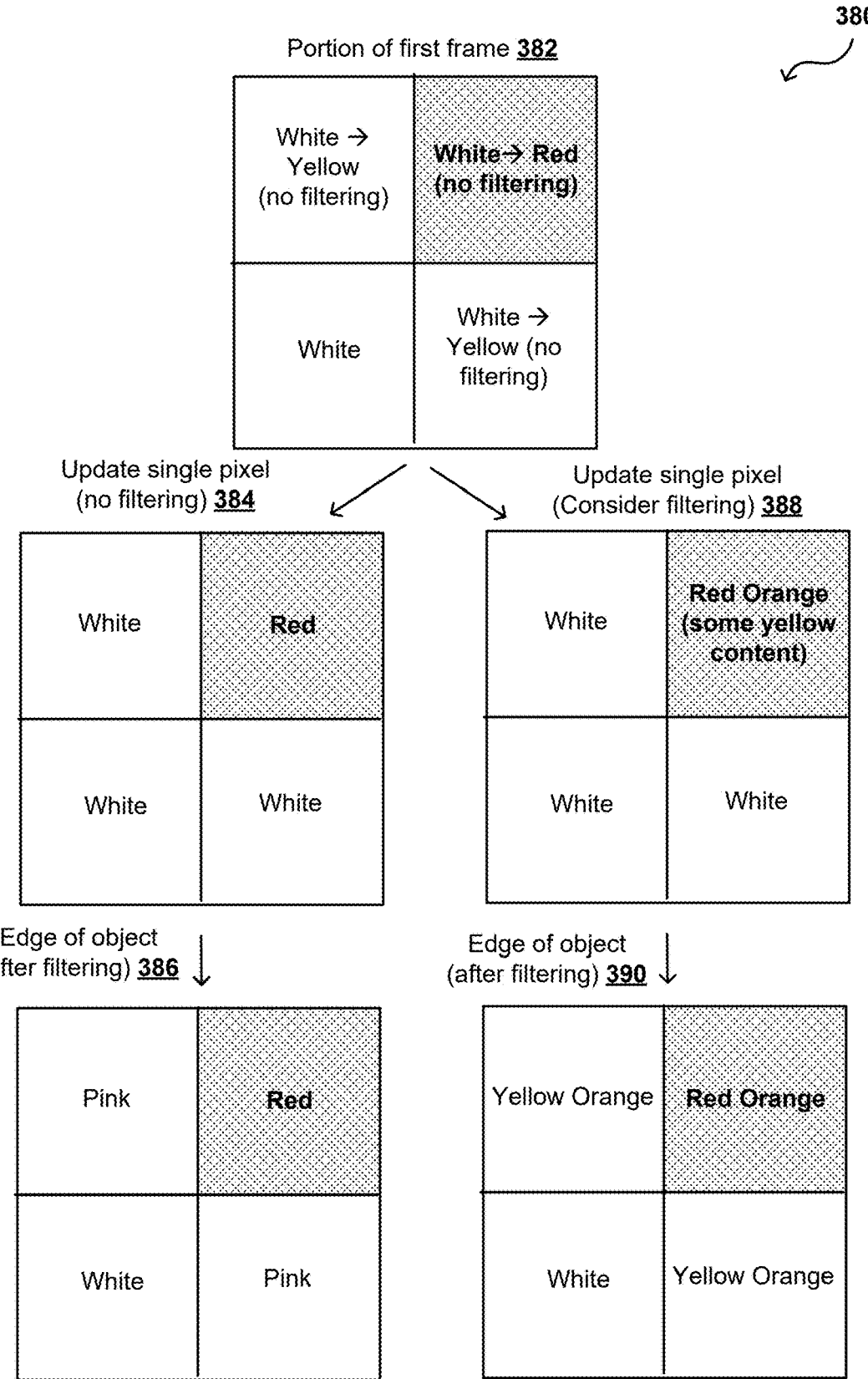

FIG. 3D illustrates another example of an approach 380 to take advantage of such pre-processing in accordance with at least one embodiment. In this example, a set of four pixel values (corresponding to a decimated pixel group 382), is shown to go from white values to red for one pixel and yellow for two other pixels. If the server were not to take client-side filtering into consideration, only the red change might be transmitted for the next frame as in the example set of pixels 384 (with the values for the other pixels remaining white from prior frames). As illustrated, with filtering applied this could result in a blending of only white and red, as illustrated in the resulting filtered image portion 386, with no hint of yellow being present in this pixel neighborhood, which can result in two of the pixels having a pink color, which would not otherwise be present in this portion of the image. By being able to pre-process the full image with the appropriate filter, the server can determine that a red-orange color value should be transmitted instead for the single pixel of this decimated pixel group as illustrated in the example set 388. In this way, the values of the group of pixels 390 after filtering will have yellow added in the pixels proximate the object edge, which can result in an image that is closer to the target image than would have been presented without the pre-processing. Such a process can thus introduce a small amount of error in the pixel that is being transmitted, in such a way as to minimize the error for the neighboring pixels that are not being transmitted. Various approaches can be used to determine the optimal filter for a given level of decimation and upsampling, as machine learning can also be used to predict/infer an optimal filter. As mentioned, such changes can occur near edges or transitions and can be updated rather quickly over four sequential frames, such that there will be little detectable difference in the transmitted video stream (and only where there was motion or a change anyway so as to be less detectable). Such an approach allows for the reduction in presence of video encoding (and other such) bottlenecks with little actual degradation in image quality, particularly for VDI-type applications where there is often only an actionable change to a small percentage of pixels between any two successive frames.

In at least one embodiment, an encoder-decoder model can be used on the server (or cloud) side, where the encoder models the decoder and pre-processes an input frame prior to decimation in a way that minimizes reconstruction error after decoding. On the encoder side, an adaptive lowpass filter can be selectively applied in areas that are determined have motion with respect to a prior frame, while areas that are static are left unchanged prior to the decimation step. Each decimated frame can be referred to as a 'field' of a polarity that indicates the spatial location of the decimated pixel (e.g., 0 to 3 for 4:1 decimation). A low-pass filter can be applied where the encoder expects the decoder to detect motion (thus using bilinear interpolation to generate the missing data), in order to minimize the difference between the reconstructed pixel and the original pixel. In static areas, the original pixel can be sent without modification. In at least one embodiment, such a process can be improved through more detailed modeling of the decoder, such as to introduce changes in the input where the decoder would incorrectly infer that there is no motion. In one example, the 5-tap low-pass filter weights are {−0.135, 0.289, 0.692, 0.289, −0.135}, applied in both directions. Improvement may also be obtained by dynamically selecting the weights depending on which surrounding pixels will use the pixel being filtered during reconstruction.

In order to avoid large discontinuities, a blending operation can be used for changes of low magnitude, to provide a continuous transition from unfiltered to filtered data. This can include use of a blending factor, as may be given by:

$$\text{blend\_factor}=\min(K*pow(\max(\text{maxdiff}-T,0),2),1)$$

where K is an arbitrary scaling factor—combining desired slope steepness and input pixel scale—and T represents a noise threshold below which small differences are to be ignored. The encoder can also model the decoder and iteratively find the value to transmit that would result in the smallest distortion after reconstruction.

On the decoder side, a reconstruction process can detect pixels that are unchanged to either do a normal up-sampling or weave the fields together, through multiple steps. In one example, the differences between field (n) and field (n–4) can be measured, as well as the difference between field (n–4) and the low-passed and decimated weaving of fields (n–3) to (n). The estimated motion can be used to reconstruct frame (n–3) using the motion estimated in previous steps to blend between spatial interpolation and the values of fields (n–2) to (n). The fields (n–2) to (n) can then be merged with the reconstructed frame (n–3) to minimize spatial artifacts where there is motion. In at least one embodiment, a hint map can be used that indicates the number of consecutive frames with no motion in a given area. As an example, a 2-bit per 64×64 tile approach can result in a 60 Kbps hint stream for 1080p at 60 hz.

In at least one embodiment, a hint map can be used that contains the number of consecutive fields that have no motion in a rectangular region, such as from 1 to 4 fields for 2-bits. Because this value tends to be the same within large areas of the frame, it can compress well independently of texture complexity, and the granularity of the tile size can be chosen to meet a specific bit rate. It is also possible to start from a large tile size, and dynamically subdivide each tile, such as down to 1×1 resolution tiles, within arbitrary bitrate constraints. One of the benefits of such a hint map is that use of such a map can prevent encoding artifacts from being interpreted as motion by the decoder. Another benefit of such an approach is that it can guarantee lossless reconstruction after four frames when there are no changes in the input.

An approach such as that disclosed above can provide a specific implementation of an encoder-decoder model, and can take advantage of pre-processing input prior to decimation to maximize the reconstructed quality of the client. In an approach in accordance with another embodiment, input to the video encoder can be produced by minimizing an objective function, as may be given by minimizing:

$$L(x)=D(x)+\lambda R(x)$$

with constraints on x, such as where 0≤x<1. In this example objective function, D(x) is a data term, as may correspond to an L1/L2 norm between a motion/no-motion map computed from the input high-res frame and a map computed on the decoder side from the current x. Further, R(x) is regularization term—as may correspond to an L2 norm between x and the decimated color frame—and, is regularization parameter controlling a trade-off between data and regularization terms.

As mentioned, various approaches can control the pipeline from the encoder to the decoder, which allows the encoder to perform actions based upon its knowledge of what the decoder will do on the client to reconstruct a high resolution frame. One solution is to pose this as a classic optimization problem. Given an input frame, the system can attempt to adjust the initial condition such that an objective function reaches its minimum. There can be a data term and a regularization term, as illustrated above. The data term can be used to capture changes to the input image at the encoder, such that the ground truth motion/no motion decision computed from the high resolution output frame available on the server after decimation will match what the client will reconstruct from the decoded frame on the client side from using the lower resolution data alone. The client only sees x, so the server can modify x as appropriate. There can be a penalty assessed any time there is a difference determined. There can be constraints on the data term, such as to not have negative values or values exceeding 1.0. The regularization term r can be used to attempt to keep things stable and close to the original input frame. There are also fast ways to solve this on a GPU. The appropriate value for lambda can be determined empirically.

A feed-forward deep learning (DL) model can be used that is based in part on a recurrent U-net architecture. Input to such a model can include the last high-resolution frame reconstructed on the client, as well as the current (or next) high-resolution frame on the server, together with polarity. Output from such a model an include a decimated (lower resolution) input frame to the video encoder. An alternative implementation can involve a different set of model weights for each polarity, which can be chosen by the encoder at run-time. The encoder can compress the bitstream, which is encoded and goes to the client. The client can then perform basic reconstruction. This may, however, lead to an end-to-end training problem. The desired output and the input are known, and can be used for training. If the entire pipeline is expressed in a differentiable way, then it can be trained end-to-end. A DL model can be trained to modify the input image such that going through the entire cycle, the differences between the input and output images will be minimized. In such an approach, it does not matter what the network produces—it might be a quite blurry image—as long as it will result in an optimal output image. Such a DL model may take the form of a feed-forward model based on a convolutional neural network (CNN), among other such options. The more changes made to the image to be encoded leads to an increased amount of data to be encoded and transmitted, however, so it can be desired to find an acceptable balance. An encoder can also be limited on the bitrate it can apply for individual frames. When there is a big change, the encoder can first encode a highly quantized version of the frame, with each subsequent frame then being progressively refined. This may cause problems where every difference value is interpreted as motion, and may benefit from use of a hint map.

Such approaches have advantages over prior techniques, which tended to either up-sample from low-resolution to higher resolution data, and/or perform de-interlacing, by generating missing data from a decimated input. Approaches disclosed herein avoid much of the complexity in generating missing data in decimated video by having the encoder pre-process the input. Some advanced spatio-temporal reconstruction techniques are known that are domain (graphics) specific and as such require extra inputs (g-buffers, projection matrices, etc.), but approaches presented herein can work with data from a color buffer (or other such source) alone. Further, relative to various remote desktop solutions, approaches disclosed herein do not require custom protocols or deep integration into the display and window system stack. Additionally, an optional hint map data stream can make such solutions more robust to data loss introduced during transmission, such as may include changes in pixel values due to changes in encoder quantization during lossy video compression.

As mentioned, some approaches can make use of a hint map to further improve reconstruction quality. In an example where there is 4:1 decimation, there may be a single change that results in motion between two frames for a significant number of pixels, such as where a user opens a new interface window. In the first decimated frame that is sent, all the values included may be pre-processed, such as by being filtered with a low-pass filter. In the next video frame there would be no changes detected by the server resulting from the instantaneous transition for the prior frame. When the second decimated frame is analyzed by the client device, however, the client device can compare the values against those received four frames ago, and can determine there is motion and does upsampling or bilinear interpolation using the values in the second decimated frame. Because these pixels were not associated with motion on the server, the server would not have performed filtering on these pixels and would have passed along the static values instead. Accordingly, when the client performs interpolation on these values the results may be poor quality in appearance. After another four frames where no motion is detected the quality may reappear. In such an approach, it may take multiple frames for the quality to recover, which may be made worse by the encoder that might do things progressively to try to make the frame look better.

To help avoid this issue, the server can send a hint map or other sideband information that can indicate to the client whether and/or where the current frame has changed since the prior frame. If there is no motion for a current frame, or 2 to 3 of the most recent frames, the client can apply bilinear interpolation to one or two of the oldest fields that were previously received, and slowly start merging the more recently-received fields in with those results. Such an approach can help the newer frames to start looking better right away, rather than waiting a full five frames or more for the static data to catch up. A hint map can therefore be used to tell the client how to interpret and handle the values sent for any given current frame. A hint map may be sent with every frame (the map should be very small in size), or only for those frames where it is determined to be appropriate. Without a hint map, quality may actually degrade until the values catch up. Another benefit of a small hint map, such as a 2-bit hint map, is that it can be sent without having to be processed by the encoder. A hint map can also help to prevent artifacts from being interpreted as motion, as motion can otherwise be determined for any maximum per-pixel difference within a 3×3 group of neighboring pixels that exceeds a noise threshold.

FIG. 4A illustrates an example process 400 that can be performed to encode spatially decimated video frames, according to at least one embodiment. It should be understood that for these and other processes presented herein there may be additional, fewer, or alternative steps performed in similar or alternative orders, or at least partially in parallel, within the scope of the various embodiments unless otherwise specifically stated. Further, although this example will be discussed with respect to lowpass filtering and application video frames, there can be other types of image-based content and other processing techniques that can be used as well within the scope of various embodiments. In this example process 400, server (or other computing resource) can receive 402 a current video frame of a sequence of full resolution video frames rendered for an application. This may include, for example, a sequence of video frames in which changes in pixel values between frames are generally limited. The server can compare 404 the current video frame against the prior video frame, both in full resolution, to determine pixels of the pair that are associated with motion or an actionable change in pixel value, such as a change that exceeds a noise threshold. For pixels where the values have not changed, those pixel values can remain unchanged so that the actual pixel values are transmitted. For pixels were motion is detected, adaptive lowpass filtering (or other processing) can be performed 408 at the server. After any such pre-processing, a decimation (or regular sub-sampling) of the current video frame can be performed 410, including the filtered pixels associated with motion and the actual values for static pixels not determined to be associated with motion. The decimated video file can then be encoded 412 for transmission and decoding by a client (or other such recipient). In at least one embodiment, a hint map or hint information can also be generated for the decimated video and transmitted 414 to the client.

FIG. 4B illustrates an example process 430 that can be performed by a client device receiving such a decimated and encoded video frame, according to at least one embodiment. In this example, a current decimated video of a video sequence is received 432 to a client device. The decimated video frame can be compared 434 against a prior decimated video frame in the video sequence, where the prior frame to be used for the comparison is determined based in part upon the level of decimation. For example, in a 4:1 decimation scheme a video frame four frames prior would be examined, wherein pixel values for the same subset of pixels were previously received by the client device. Pixels associated with motion (or an actionable change) between the current and determined prior decimated video frames can be determined 438, which in at least one embodiment may make use 440 of an optional hint map received over a sideband channel from the server having generated the decimated video frames. In this example, bilinear interpolation (or another upsampling technique) can be performed 442 on pixels determined to be associated with motion or an actionable change, with the actual pixel values being maintained for static pixels not associated with motion. A full resolution, current video frame can be provided 444 for display in the video sequence, where any motion or actionable changes in the video frame may result in interpolated pixel values. If there are not actionable changes over at least four frames for 4:1 decimation, then the full resolution output frame at the client should correspond exactly to the corresponding full resolution input frame at the server.

A client device can analyze neighboring pixels to determine whether there is motion that affects a given pixel. In at least one embodiment, for a given pixel the client can analyze the difference between a current pixel and the pixel value that was received for the same polarity (i.e., the value for the same pixel four frames ago for 4:1 decimation) to determine whether there was an actionable difference in that pixel or a neighboring pixel that exceeded a noise threshold. Based in part upon whether motion is detected, the client can determine whether to treat the reconstruction as an upsampling operation or an interleave-type (or weave-type) operation.

FIG. 4C illustrates another example process 460 for decimating and encoding a video frame according to at least one embodiment. In this example, a decimated image is generated 462 from a full resolution image, where the decimated image includes pixel values for a selected subset of pixels, the pixel values including filtered (or otherwise pre-processed) pixel values where an actionable change is detected, and actual pixel values where no actionable change is detected. The decimated image can then be encoded 464 to be transmitted to a client device (or other such recipient), where the client device is allowed to reconstruct the full resolution image over a sequence of video frames using interpolation on the included pixel values where an actionable change is detected. If there are no actionable changes detected over a number of frames then the pixel values of the full resolution output image at the client should correspond to the pixel values of the full resolution input image at the server.

In such an approach, the decimation can be performed using regular sub-sampling that does not introduce significant blurriness. Further, for regions of the video sequence where there is no change in pixel values for at least a period of time, such an approach can guarantee that the display will appear the same as if it were streamed at full resolution, as static areas on the frames are preserved. And after a limited number of static frames (e.g., 4-5 frames) it can also be ensured that the video is completely lossless. Since the server has information about how the decimated video will be processed and reconstructed by the client, the server can optimize the decimated video for maximum output quality. Such an approach can also be agnostic to the type of image or video content being processed, encoded, and reconstructed.

There can be other types of pre-processing performed by a server as well, as long as the client and server both perform the same processing (or are at least aware of the type of processing to be performed). This might include use of a spatially-varying filter that only blurs in certain areas. Such an approach might also include use a deep learning model, which can take the input frame and, based on being trained with the knowledge of what happens on the client side, can attempt to maximize the quality of the reconstructed frame by inferring certain operations or pre-processing to be performed on the input frame. It can be desirable for image features after reconstruction to be locally and temporarily smooth, although making additional changes can impact encoding efficiency and may increase artifacts.

Figure 5:
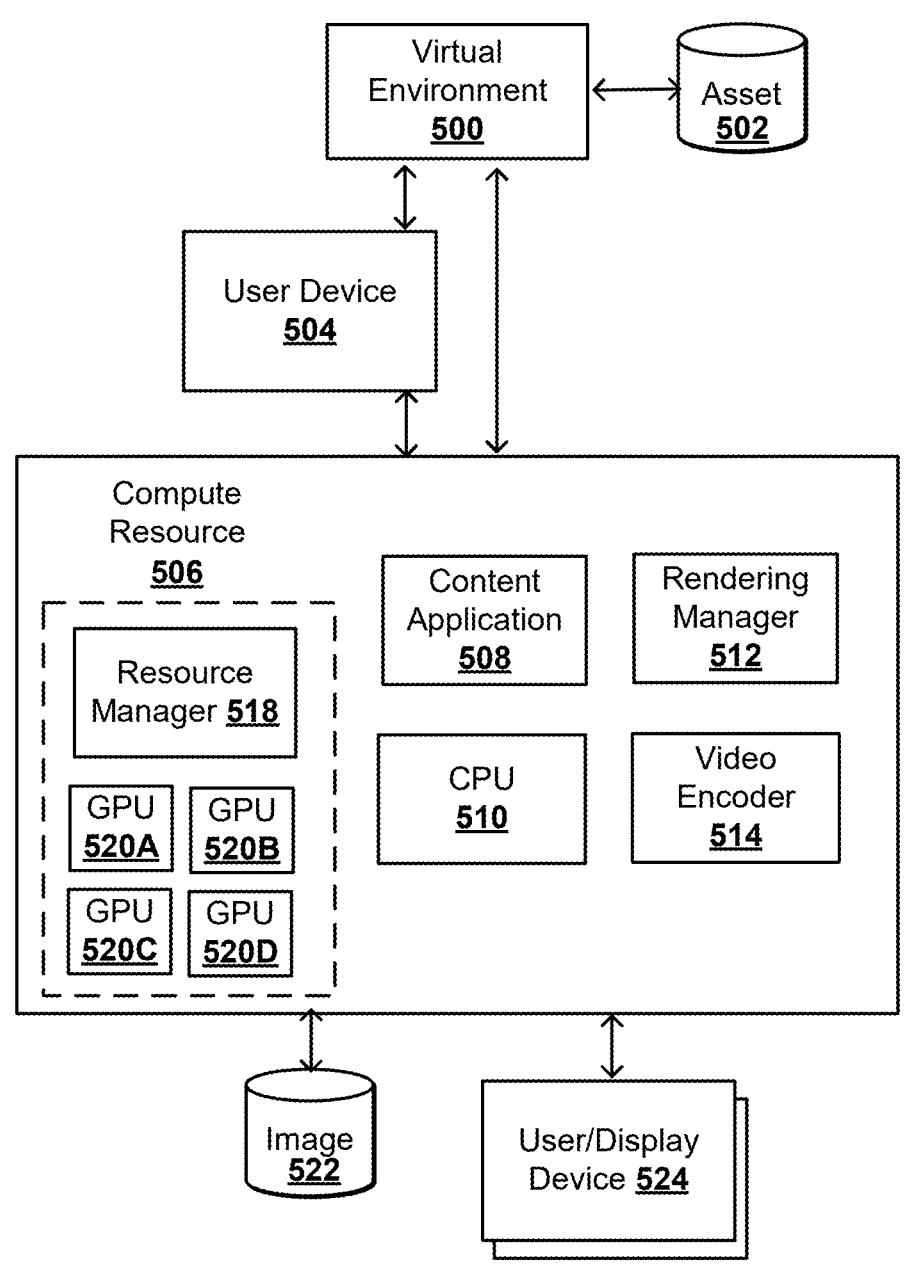
FIG. 5 illustrate components of an example content generation system, according to at least one embodiment.

FIG. 5 illustrates an example system 500 that can be used to generate a sequence of video frames, or other such instance of image-related content, in accordance with at least one embodiment. In this example, an image is to be rendered for a virtual environment 500. In at least some embodiments or instances, there can be a user device 504 running a content generation or management application that can allow a user to select assets 502 or provide input for use in rendering an image or video frame. The user device 504 can also allow a user to control aspects of the image to be rendered.

In this example, at least one compute resource 506 is used to perform the rendering. This resource may correspond to one or more servers, for example, that may be located locally or across at least one network, among other such options. In some embodiments, the rendering may instead be at least partially performed on the user device 504. The compute resource 506 may obtain or receive data to be used for the rendering. This information may be received to a content application 508, for example, that may be executing on a central processing unit (CPU) 510 of the compute resource that is responsible for tasks such as collecting data, causing an image to be rendered, and performing any formatting or encoding of a produced image, among other such operations. The content application can work with a rendering manager 512, for example, which can be responsible for coordinating operations of a rendering pipeline executing on the compute resource 506, as may include modules 514 or processes responsible for tasks such as video encoding or pre-processing, among other such tasks. In at least some embodiments, at least some of these image processing tasks may be performed using one or more GPUs 520A-D of the compute resource, as well as potentially one or more processors or compute instances (physical or virtual) of one or more other compute resources. Rendered content can be stored to an image repository 522 or provided for presentation via a user device and/or display device 524, among other such options.

An image generation task can be performed using a single processor, such as a single GPU, or can have operations distributed across multiple GPUs 520A-D). In this example, there can be a pool or set of GPUs 520A-D, and a resource manager 518 can be at least partially responsible for allocating a GPU to perform the processing for an operation. If it is desired or beneficial to use more than one GPU then the resource manager 518 can allocate one or more GPUs having the appropriate capacity or capabilities. This can include allocating a number of GPUs indicated in a request, or determining a number of GPUs to allocate based in part on the request. In some embodiments, the resource manager may also be able to monitor an available bandwidth or memory in order to determine which and how many GPUs to allocate, such as where having high bandwidth capacity can allow operations to be spread across a greater number of GPUs, where bandwidth impact due to forwarding ray information will not be as critical, while having a bandwidth constrained system may cause the resource manager to attempt to allocate as few GPUs as possible in order to attempt to reduce the number of forwarding messages required.

In at least one embodiment, a partitioning of data can be performed by a rendering manager 512, for example, and the assigning of data to different processors can be performed by a resource manager 518 of the system. The resource manager can receive information from the rendering component, and can select appropriate processors from a pool of available processors 520 or processor capacity. In some embodiments, the rendering application can choose the partitioning, while in other embodiments the renderer may have no control over the data partitioning, which may be done by a separate management component (not illustrated in FIG. 5A).

Aspects of various approaches presented herein can be lightweight enough to execute in various locations, such as on a device such as a client device that include a personal computer or gaming console, in real time. Such processing can be performed on, or for, content that is generated on, or received by, that client device or received from an external source, such as streaming data or other content received over at least one network from a cloud server 620 or third party service 660, among other such options. In some instances, at least a portion of the processing, generation, compositing, and/or determination of this content may be performed by one of these other devices, systems, or entities, then provided to the client device (or another such recipient) for presentation or another such use.

Figure 6:
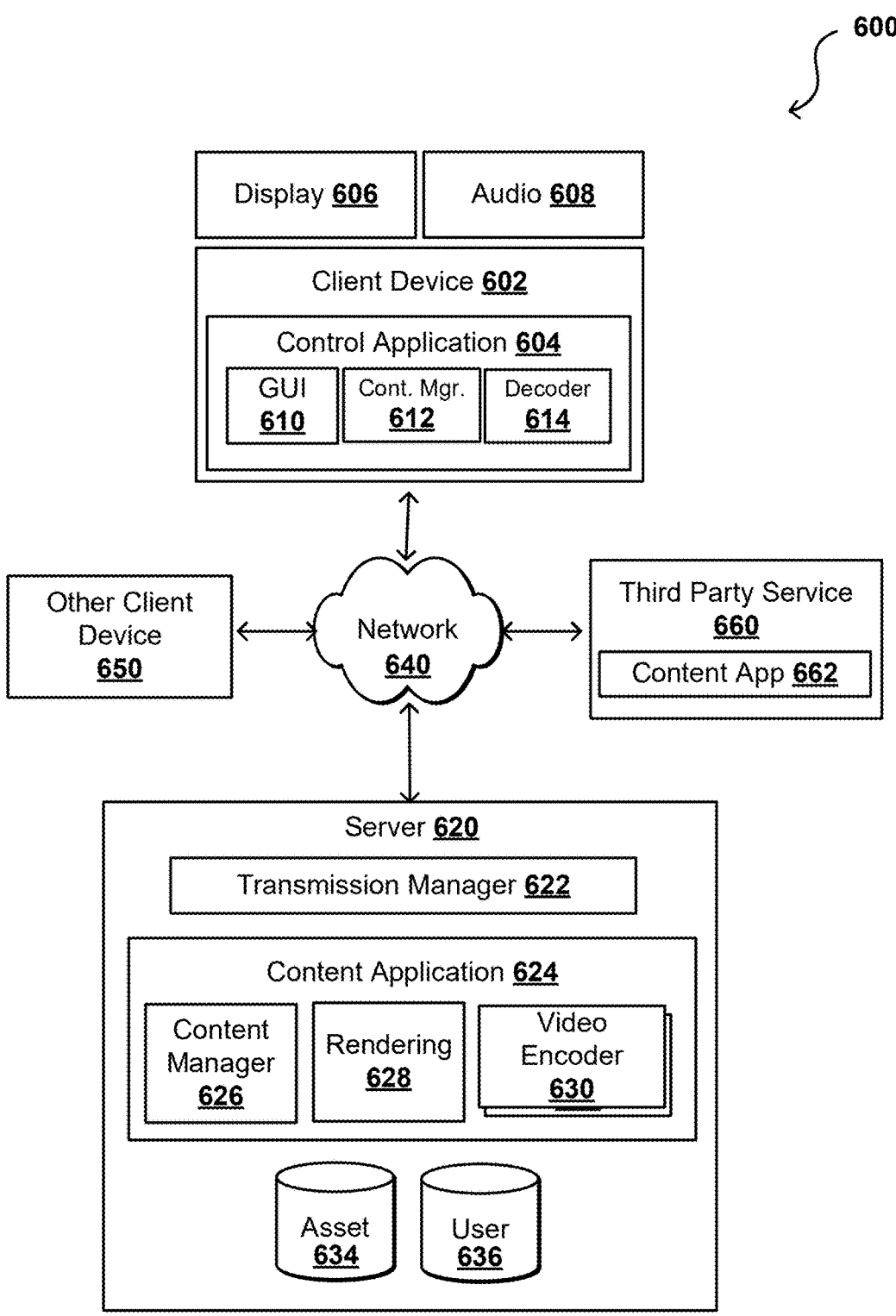
FIG. 6 illustrates components of a distributed system that can be utilized to generate, decimate, provide, and reconstruct image content, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 636, and can cause content from an asset repository 634 (or other such location) to be determined by a content manager

626. A content manager 626 may work with a rendering module 628 to generate or select objects, digital assets, or other such content to be represented in an image to be rendered. Views of these objects can be rendered by the rendering module 628 and provided for presentation via the client device 602. In at least one embodiment, the content application 624 an work with one or more encoders 630, transcoders, and/or compressors that can perform tasks such as encoding, decoding, compression, and/or decompression of a texture, image, or other such asset or instance of content, where different compressions or encodings may be beneficial for different operations, such as for storage versus processing. At least a portion of the rendered and/or compressed content may be transmitted to the client device 602 using an appropriate transmission manager 622 to send by download, streaming, or another such transmission channel. In at least one embodiment, the client device 602 receiving such content can provide this content to a corresponding content application 604, which may also or alternatively include a graphical user interface 610, content manager 612, and rendering module 614 for use in providing, synthesizing, rendering, compositing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
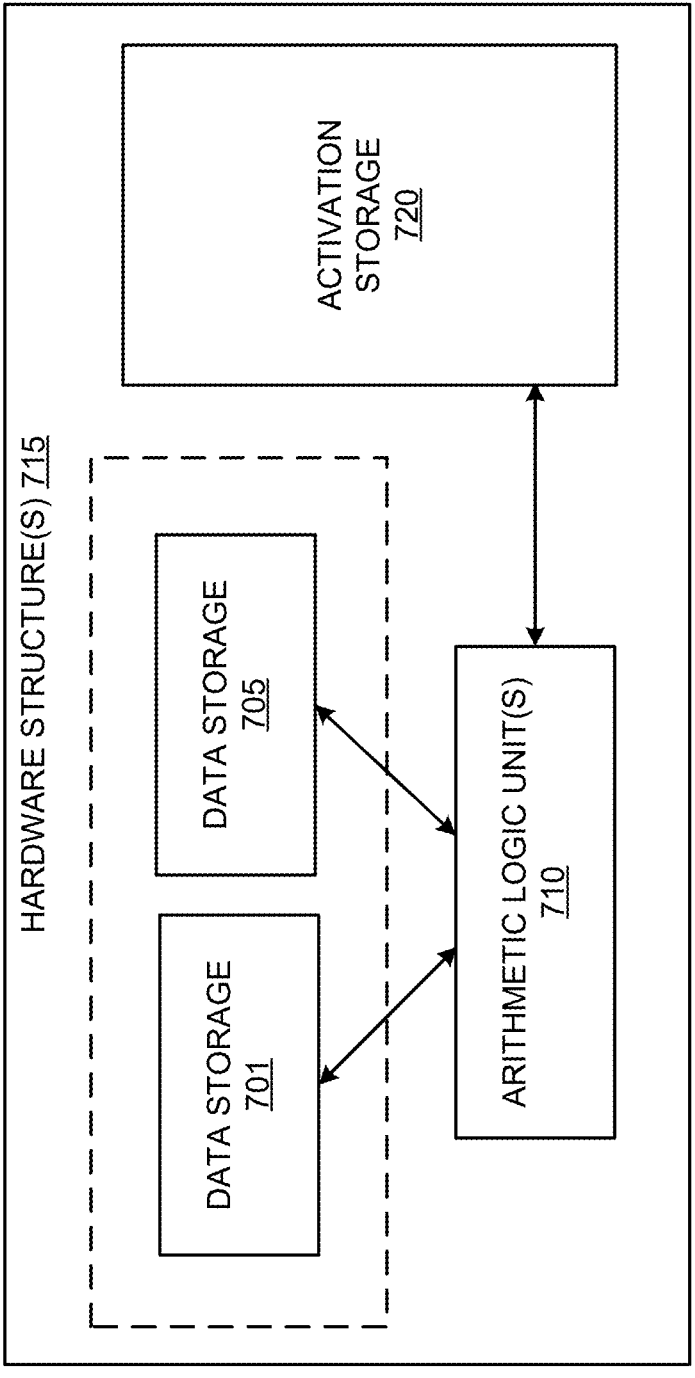
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
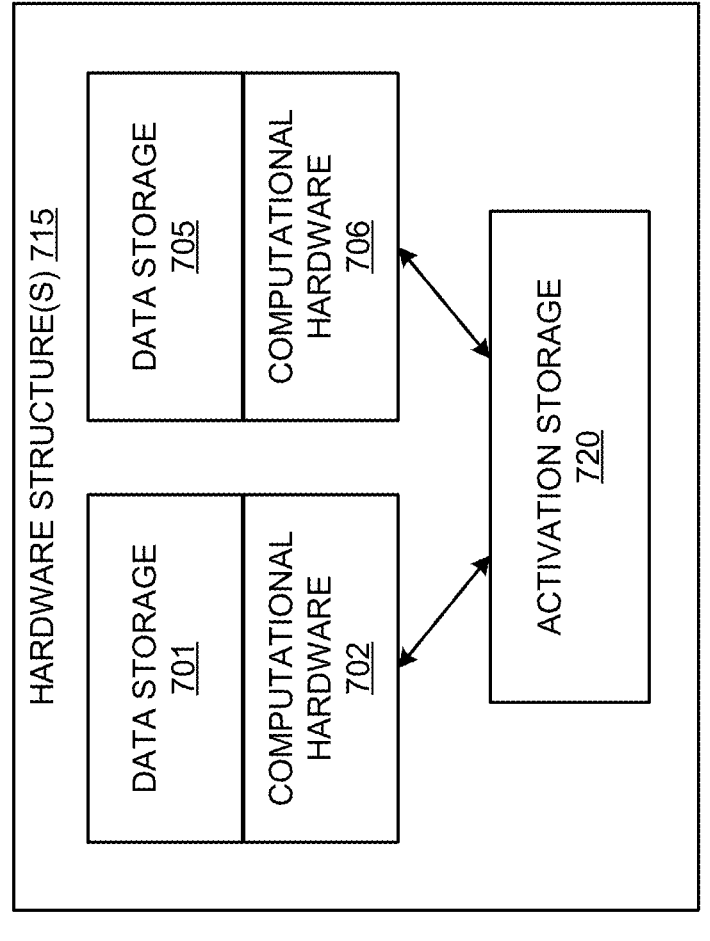
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to generate and encode decimated video frames where motion pixels are processed using a lowpass filter and static pixels retain the actual value to allow for high quality reconstruction.

Computer Systems

Figure 9:
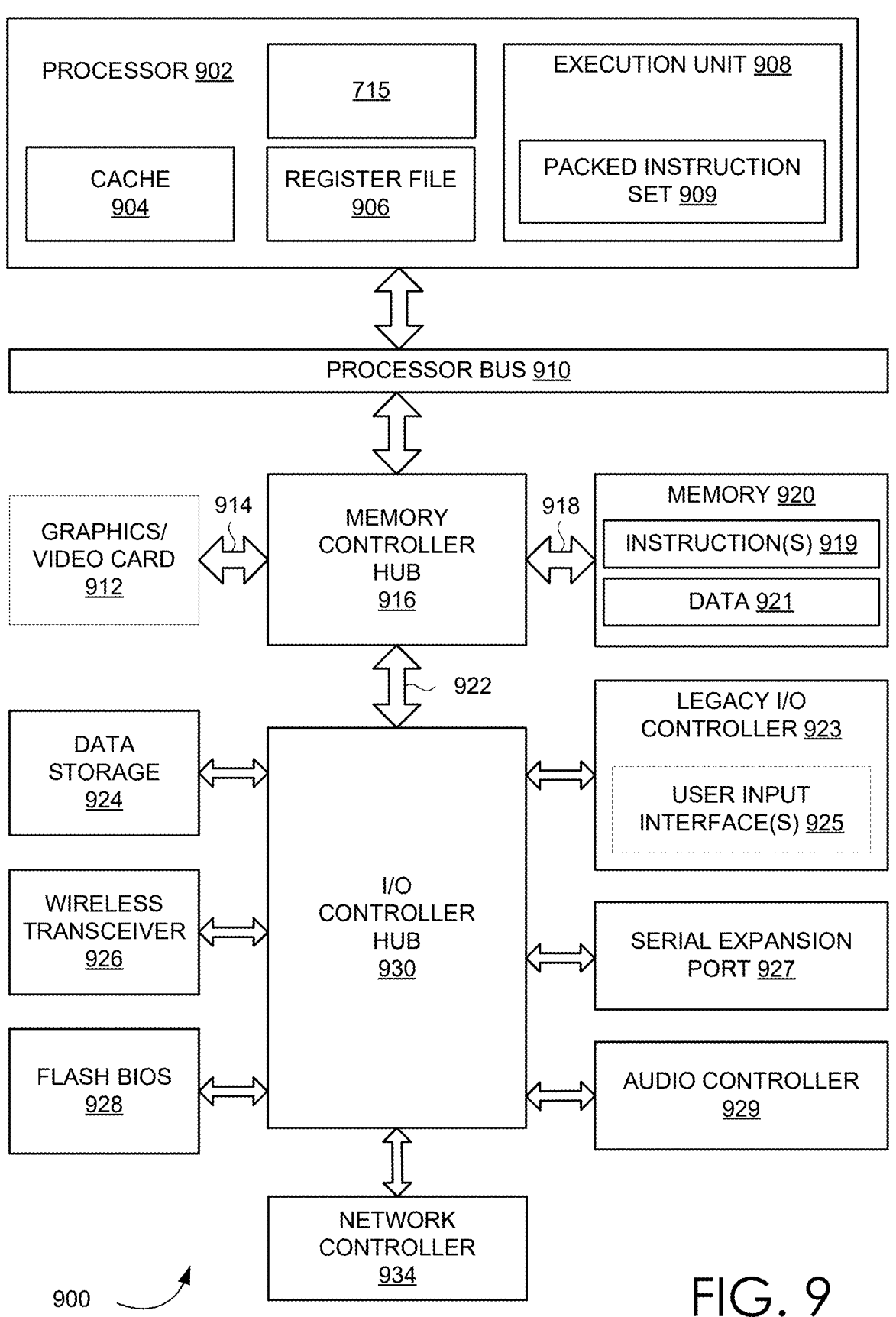
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word ("VLIW") computing microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to generate and encode decimated video frames where motion pixels are processed using a lowpass filter and static pixels retain the actual value to allow for high quality reconstruction.

Figure 10:
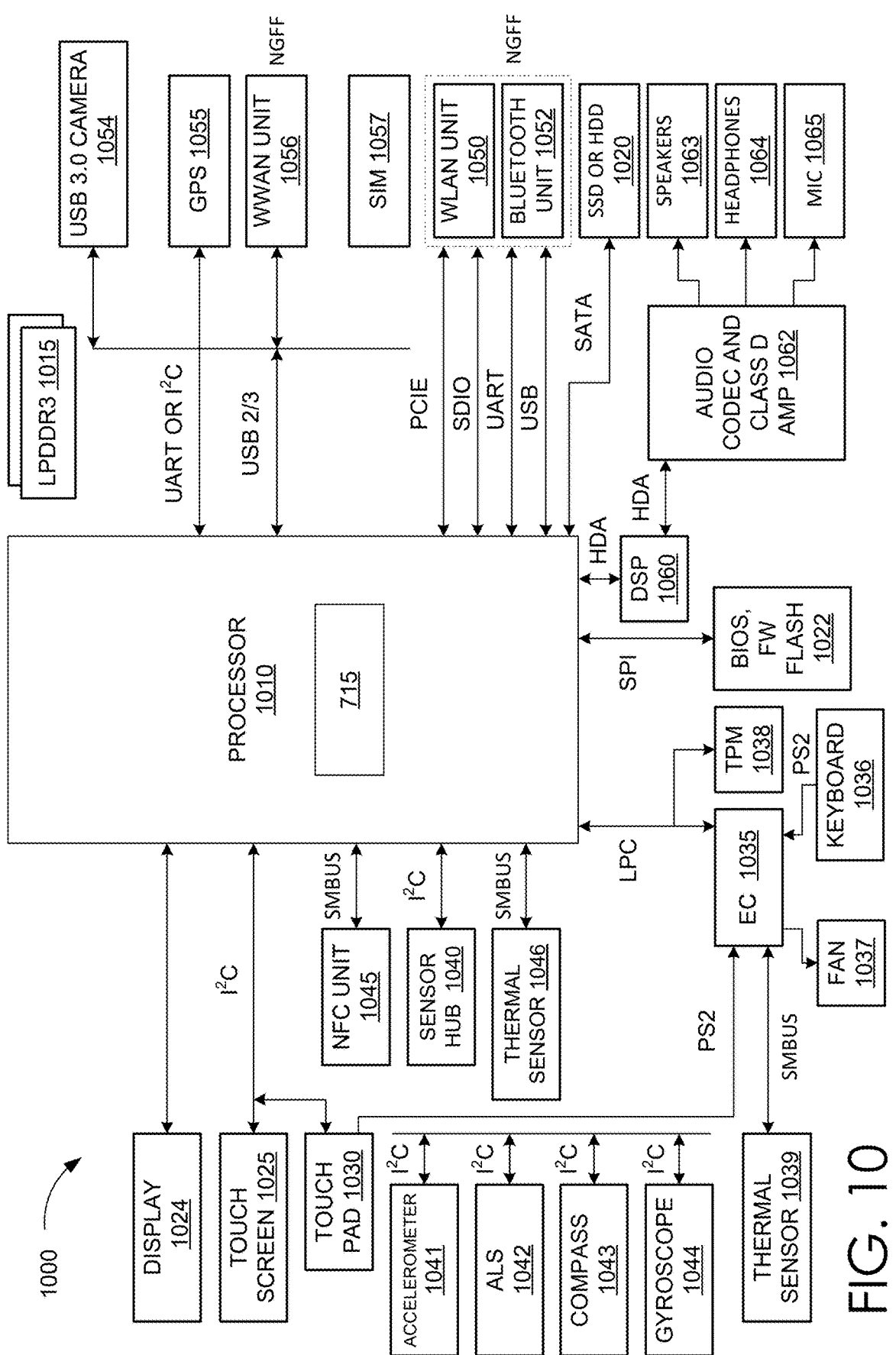
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to generate and encode decimated video frames where motion pixels are processed using a lowpass filter and static pixels retain the actual value to allow for high quality reconstruction.

Figure 11:
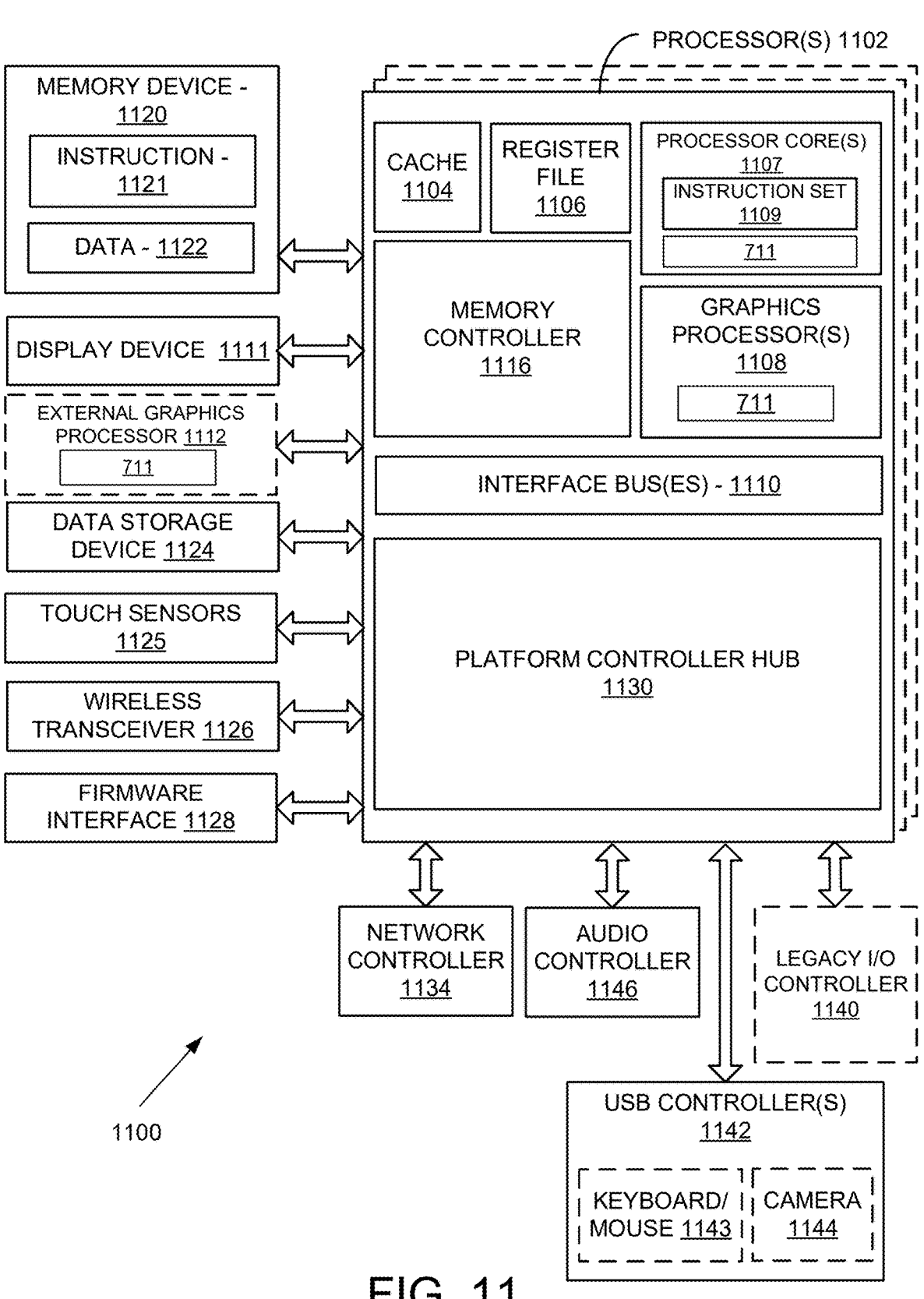
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to generate and encode decimated video frames where motion pixels are processed using a lowpass filter and static pixels retain the actual value to allow for high quality reconstruction.

Figure 12:
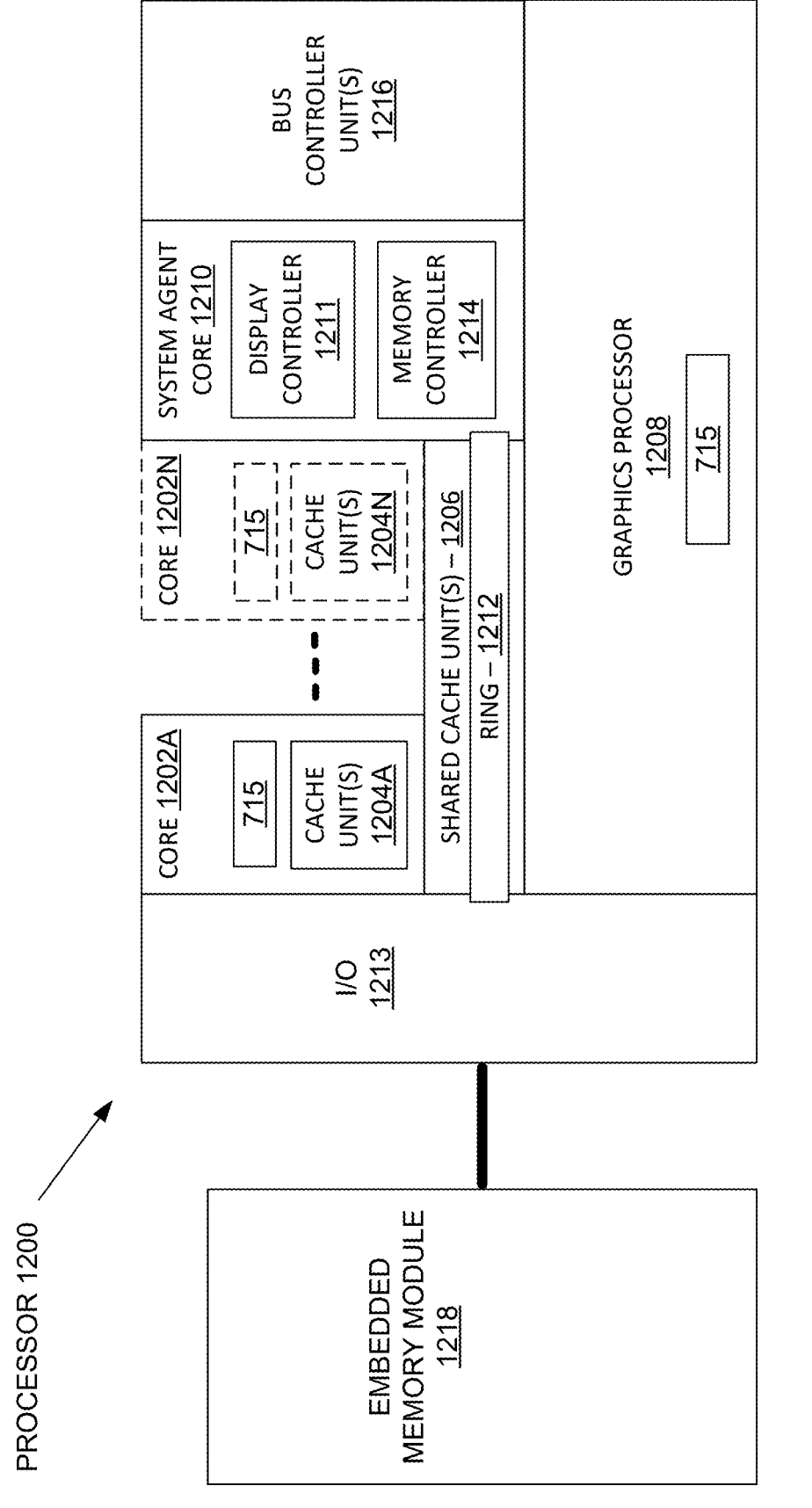
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express busses.

In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with a ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory modules 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to generate and encode decimated video frames where motion pixels are processed using a lowpass filter and static pixels retain the actual value to allow for high quality reconstruction.

Virtualized Computing Platform

Figure 13:
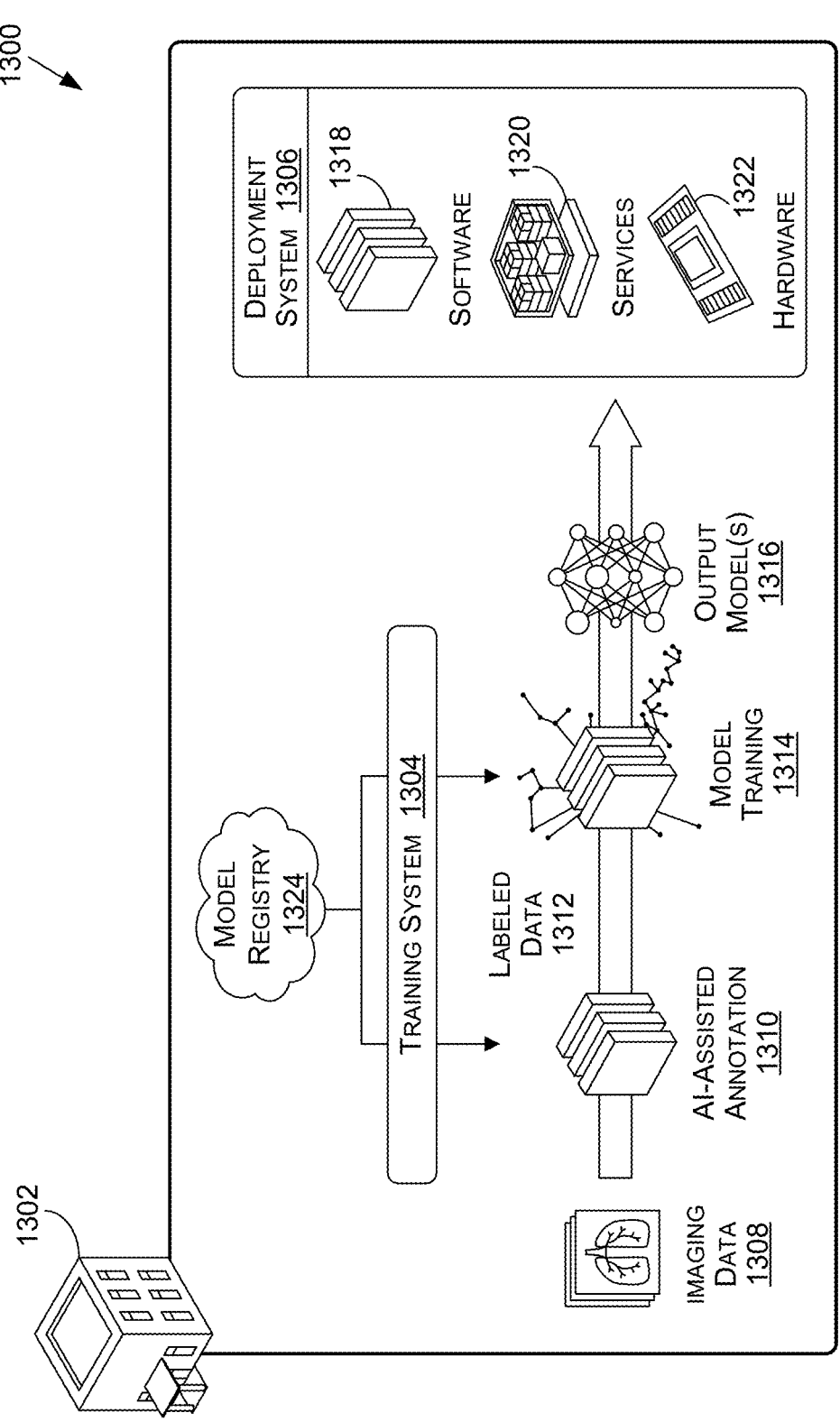
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by process 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by services 1320 being required to have a respective instance of services 1320, services 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
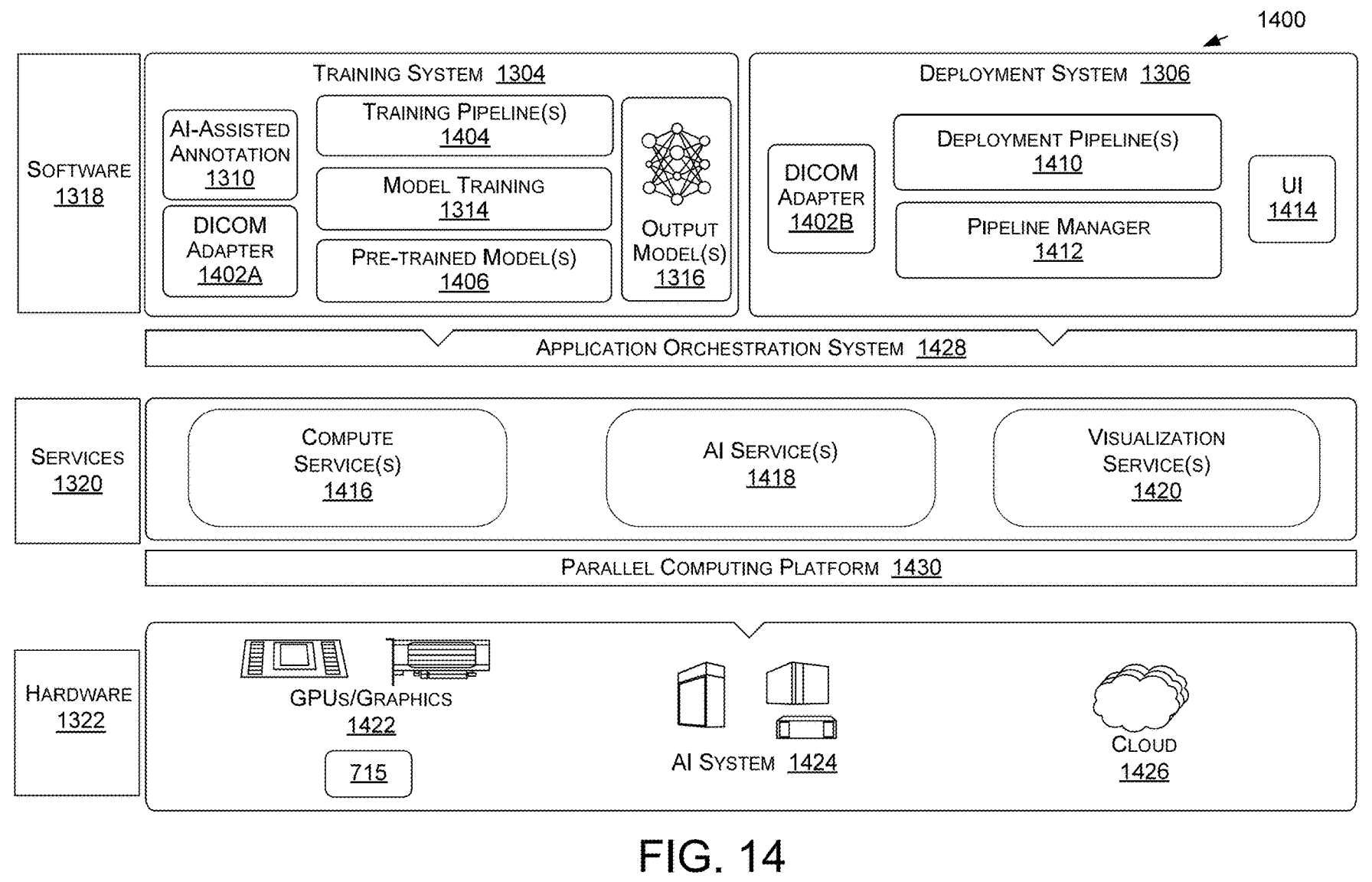

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipeline(s) 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained models 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 14B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipeline(s) 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT <1 min) priority while others may have lower priority (e.g., TAT <10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
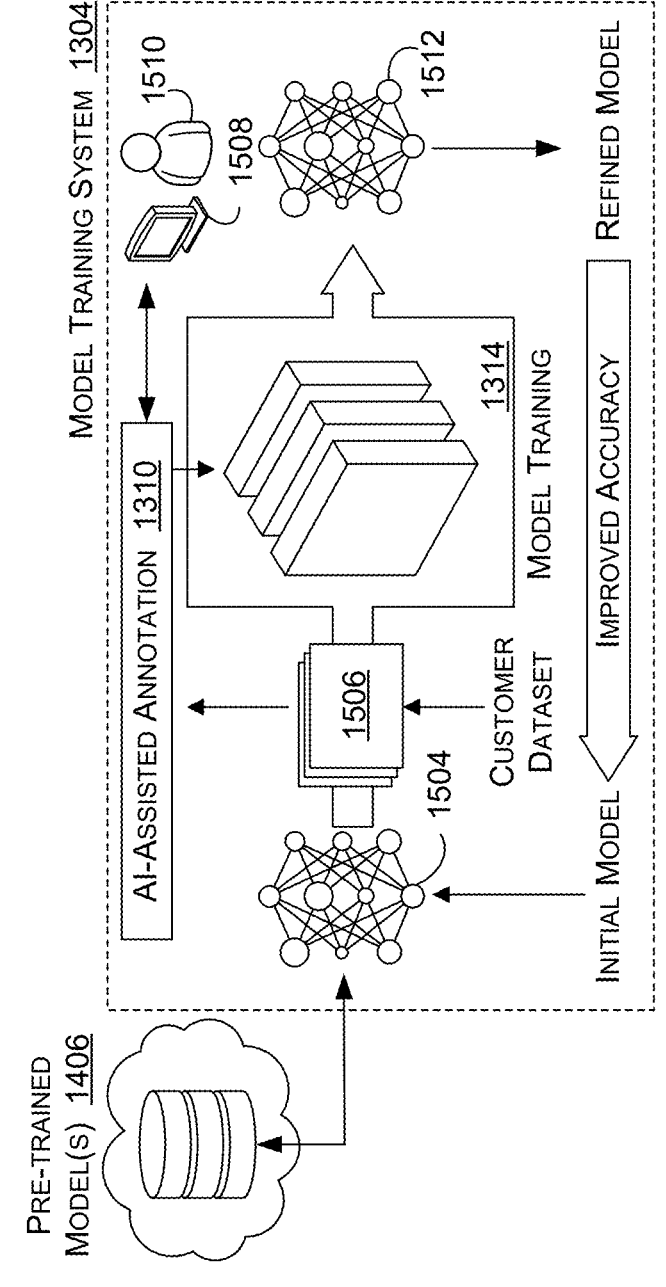

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where pre-trained models 1506 is trained at using patient data from more than one facility, pre-trained models 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained models 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:

generating, for a full resolution image frame, a decimated image including pixel values for a selected subset of pixels of the full resolution image frame, the pixel values for the selected subset corresponding to pixel values of the full resolution image frame where no actionable changes in pixel values are determined with respect to a prior full resolution image frame, the pixel values for the selected subset further corresponding to filtered pixel values based in part on neighboring pixels of the full resolution image where actionable changes in pixel values are determined with respect to a prior full resolution image frame; and encoding the decimated image to transmit to a client device, wherein the client device is allowed to reconstruct the full resolution image based on pixel values from the decimated image and a sequence of prior decimated images where no actionable changes in pixel values are determined, and upsampled pixel values from the decimated image where actionable changes to pixel values are determined.

2. The computer-implemented method of clause 1, wherein the pixel values for the full resolution image frame are transmitted over a sequence of image frames, wherein a number of the frames in the sequence corresponds to a level of decimation of the decimated image.

3. The computer-implemented method of clause 2, wherein the client device is to determine actionable changes by analyzing the current image frame with respect to a prior frame of a prior sequence of image frames, wherein a length of the prior sequence of image frames corresponds to the level of decimation of the decimated image.

4. The computer-implemented method of clause 1, wherein the filtered pixel values are determined applying a two-dimensional low-pass filter to at least one of: the pixel values or neighboring pixel values of the full resolution image where an actionable change is determined.

5. The computer-implemented method of clause 1, wherein the actionable change corresponds to a change in pixel value that meets or exceeds a pixel value change threshold.

6. The computer-implemented method of clause 1, wherein the actionable change is determined using the maximum change in pixel values between a current pixel and the neighboring pixels of a cell between the full resolution image and the prior full resolution image.

7. The computer-implemented method of clause 1, further comprising:

transmitting, to the client device, a hint map indicating pixel locations where actionable changes in pixel values were determined with respect to the prior full resolution image, wherein the client device is allowed to determine locations of actionable changes using the hint map.

8. The computer-implemented method of clause 1, wherein the hint map is transmitted to the client device over a side band channel and not encoded with the decimated image.

9. The computer-implemented method of clause 1, wherein the decimated image is generated using a trained machine learning model.

10. At least one processor comprising one or more logical units to:

compare pixel values of a current image frame against corresponding pixel values of a prior image frame to identify regions of actionable differences;

perform adaptive lowpass filtering on pixel values determined to be associated with one or more of the actionable differences;

generate a decimated version of the current image frame, the decimated version including pixel values of the current image frame for regions with no identified actionable differences, and including filtered pixel values for regions with identified actionable differences; and encode the decimated version of the current image to transmit to a recipient device, wherein the recipient device is to reconstruct the current image frame based on the pixel values from the decimated image and a sequence of prior decimated images for regions where no actionable differences are identified, and upsampled pixel values from the decimated image for regions where actionable differences are determined.

11. The at least one processor of clause 10, wherein pixel values for one or more pixel locations of the full resolution image frame are transmitted over one of a sequence of image frames, wherein a number of the frames in the sequence corresponds to a level of decimation of the decimated image.

12. The at least one processor of clause 10, wherein the client is to determine actionable changes by analyzing the current image frame with respect to a prior frame of a prior sequence of image frames, wherein a length of the prior sequence of image frames corresponds to the level of decimation of the decimated image.

13. The at least one processor of clause 10, wherein the one or more logical units are further to:

transmit, to the client device, a hint map indicating pixel locations where actionable changes in pixel values were determined with respect to the prior full resolution image, wherein the client device is allowed to determine locations of actionable changes using the hint map.

14. The at least one processor of clause 10, wherein the decimated image is generated using a trained machine learning model.

15. The at least one processor of clause 10, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a system for performing generative AI operations using a large language model (LLM);

a system for performing generative AI operations using a vision language model (VLM);

a system for performing generative AI operations using a multi-modal language model;

a collaborative content creation platform for 3D assets; or a system implemented at least partially using cloud computing resources.

16. A system comprising:

one or more processors to generate a decimated image for reconstruction based, at least in part, on pixel values of a current input image for regions with no identified actionable differences, and on filtered pixel values for regions of the current input image with identified actionable differences with respect to a prior input image of an image sequence.

17. The system of clause 16, wherein the filtered pixel values are determined using an adaptive low pass filter on the regions of the current input image with identified actionable differences.

18. The system of clause 16, wherein the reconstruction is perform using bilinear interpolation for regions with identified actionable differences.

19. The system of clause 16, wherein the one or more processors are further to transmit, to a client device to perform the reconstruction, a hint map indicating pixel locations where actionable changes in pixel values were determined with respect to the prior full resolution image, wherein the client device is allowed to determine locations of actionable changes using the hint map.

20. The system of clause 16, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system for performing generative AI operations using a large language model (LLM);

a system for performing generative AI operations using a vision language model (VLM);

a system for performing generative AI operations using a multi-modal language model;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
generating, for a full resolution image frame, a decimated image including pixel values for a selected subset of pixels of the full resolution image frame, the pixel values for the selected subset corresponding to pixel values of the full resolution image frame where no actionable changes in pixel values are determined with respect to a prior full resolution image frame, the pixel values for the selected subset further corresponding to filtered pixel values based in part on neighboring pixels of the full resolution image frame where actionable changes in pixel values are determined with respect to a prior full resolution image frame; and
encoding the decimated image to transmit to a client device, wherein the client device is allowed to reconstruct the full resolution image frame based on pixel values from the decimated image and a sequence of prior decimated images where no actionable changes in pixel values are determined, and upsampled pixel values from the decimated image where actionable changes to pixel values are determined.

2. The computer-implemented method of claim 1, wherein the pixel values for the full resolution image frame are transmitted over a sequence of image frames, wherein a number of the image frames in the sequence corresponds to a level of decimation of the decimated image.

3. The computer-implemented method of claim 2, wherein the client device is to determine actionable changes by analyzing a current image frame with respect to a prior frame of a prior sequence of image frames, wherein a length of the prior sequence of image frames corresponds to the level of decimation of the decimated image.

4. The computer-implemented method of claim 1, wherein the filtered pixel values are determined applying a two-dimensional low-pass filter to at least one of: the pixel values or neighboring pixel values of the full resolution image frame where an actionable change is determined.

5. The computer-implemented method of claim 1, wherein the actionable change corresponds to a change in pixel value that meets or exceeds a pixel value change threshold.

6. The computer-implemented method of claim 1, wherein the actionable change is determined using the maximum change in pixel values between a current pixel and the neighboring pixels of a cell between the full resolution image frame and the prior full resolution image frame.

7. The computer-implemented method of claim 1, further comprising:
transmitting, to the client device, a hint map indicating pixel locations where actionable changes in pixel values were determined with respect to the prior full resolution image frame, wherein the client device is allowed to determine locations of actionable changes using the hint map.

8. The computer-implemented method of claim 7, wherein the hint map is transmitted to the client device over a side band channel and not encoded with the decimated image.

9. The computer-implemented method of claim 1, wherein the decimated image is generated using a trained machine learning model.

10. At least one processor comprising one or more logical units to:
compare pixel values of a current image frame against corresponding pixel values of a prior image frame to identify regions of actionable differences;
perform adaptive lowpass filtering on pixel values determined to be associated with one or more of the actionable differences;
generate a decimated version of the current image frame, the decimated version including pixel values of the current image frame for regions with no identified actionable differences, and including filtered pixel values for regions with identified actionable differences; and
encode the decimated version of the current image frame to transmit to a recipient device, wherein the recipient device is to reconstruct the current image frame based on the pixel values from the decimated version of the current image frame and a sequence of prior decimated images for regions where no actionable differences are identified, and upsampled pixel values from the decimated version of the current image frame for regions where actionable differences are determined.

11. The at least one processor of claim 10, wherein the pixel values for one or more pixel locations of the current image frame are transmitted over one of a sequence of image frames, wherein a number of the image frames in the sequence corresponds to a level of decimation of the decimated version of the current image frame.

12. The at least one processor of claim 10, wherein the recipient device is to determine actionable changes by analyzing the current image frame with respect to a prior frame of a prior sequence of image frames, wherein a length of the prior sequence of image frames corresponds to a level of decimation version of the current image frame.

13. The at least one processor of claim 10, wherein the one or more logical units are further to:

transmit, to the recipient device, a hint map indicating pixel locations where actionable changes in pixel values were determined with respect to the prior image frame, wherein the recipient device is allowed to determine locations of actionable changes using the hint map.

14. The at least one processor of claim 10, wherein the decimated version of the current image frame is generated using a trained machine learning model.

15. The at least one processor of claim 10, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a system for performing generative AI operations using a large language model (LLM);

a system for performing generative AI operations using a vision language model (VLM);

a system for performing generative AI operations using a multi-modal language model;

a collaborative content creation platform for 3D assets; or a system implemented at least partially using cloud computing resources.

16. A system comprising:

one or more processors to generate a decimated image for reconstruction based, at least in part, on pixel values of a current input image for regions with no identified actionable differences, and on filtered pixel values for regions of the current input image with identified actionable differences with respect to a prior input image of an image sequence.

17. The system of claim 16, wherein the filtered pixel values are determined using an adaptive low pass filter on the regions of the current input image with identified actionable differences.

18. The system of claim 16, wherein the reconstruction is perform using bilinear interpolation for regions with identified actionable differences.

19. The system of claim 16, wherein the one or more processors are further to transmit, to a client device to perform the reconstruction, a hint map indicating pixel locations where actionable changes in pixel values were determined with respect to the prior input image, wherein the client device is allowed to determine locations of actionable changes using the hint map.

20. The system of claim 16, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system for performing generative AI operations using a large language model (LLM);

a system for performing generative AI operations using a vision language model (VLM);

a system for performing generative AI operations using a multi-modal language model;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

\* \* \* \* \*